(12) United States Patent
Lee

(10) Patent No.: US 12,363,407 B2
(45) Date of Patent: Jul. 15, 2025

(54) CAMERA MODULE AND OPTICAL DEVICE

(71) Applicant: LG INNOTEK CO., LTD., Seoul (KR)

(72) Inventor: Young Kil Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/636,669

(22) Filed: Apr. 16, 2024

(65) Prior Publication Data

US 2024/0259660 A1 Aug. 1, 2024

Related U.S. Application Data

(63) Continuation of application No. 17/756,135, filed as application No. PCT/KR2020/015137 on Nov. 2, 2020, now Pat. No. 11,991,432.

(30) Foreign Application Priority Data

Nov. 18, 2019 (KR) .......................... 10-2019-0147581

(51) Int. Cl.
  *H04N 23/54* (2023.01)
  *H04N 23/55* (2023.01)

(52) U.S. Cl.
  CPC ............. *H04N 23/54* (2023.01); *H04N 23/55* (2023.01)

(58) Field of Classification Search
  CPC ........ H04N 23/54; H04N 23/55; H04N 23/57; H04N 23/45; H04N 23/58
  See application file for complete search history.

(56) References Cited

U.S. PATENT DOCUMENTS 11,991,432 B2 * 5/2024 Lee ........................ H04N 23/57
2011/0097061 A1 4/2011 Lee et al.
(Continued)

FOREIGN PATENT DOCUMENTS

CN 105446053 A 3/2016
CN 109154712 A 1/2019
(Continued)

OTHER PUBLICATIONS

International Search Report dated Jan. 26, 2021 in International Application No. PCT/KR2020/015137.
(Continued)

*Primary Examiner* — James M Hannett
*Assistant Examiner* — Angel L Garces-Rivera
(74) *Attorney, Agent, or Firm* — Saliwanchik, Lloyd & Eisenschenk

(57) ABSTRACT

An embodiment may comprise: a housing; a first circuit board disposed in the housing; a magnet disposed in the housing; a holder spaced apart from the housing; a second circuit board coupled to the holder; a coil disposed on the second circuit board and corresponding to the magnet; a connection substrate comprising a first terminal; an image sensor disposed on the connection substrate; a support member having one end coupled to the first circuit board; and an elastic connection member comprising a first coupling part disposed in the holder and coupled to the first terminal, a second coupling part coupled to the other end of the support member, and a connection part for connecting the first coupling part and the second coupling part.

19 Claims, 27 Drawing Sheets

(56) References Cited

U.S. PATENT DOCUMENTS

2013/0182136 A1    7/2013   Ishizue
2019/0297235 A1    9/2019   Huang et al.

FOREIGN PATENT DOCUMENTS

| CN | 109906407 A | 6/2019 |
| JP | 2016-38444 A | 3/2016 |
| JP | 6311434 B2 | 4/2018 |
| KR | 10-2016-0022656 A | 3/2016 |
| KR | 10-2016-0035244 A | 3/2016 |
| KR | 10-2019-0053411 A | 5/2019 |

OTHER PUBLICATIONS

Office Action dated Apr. 8, 2023 in Chinese Application No. 202080087964.8.
Office Action dated Oct. 14, 2023 in Chinese Application No. 202080087964.8.
Notice of Allowance dated Jan. 16, 2024 in U.S. Appl. No. 17/756,135.

* cited by examiner

FIG.10
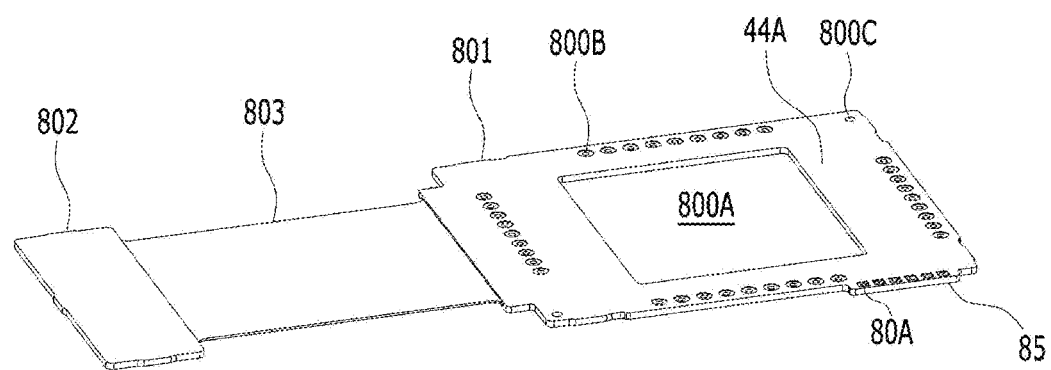
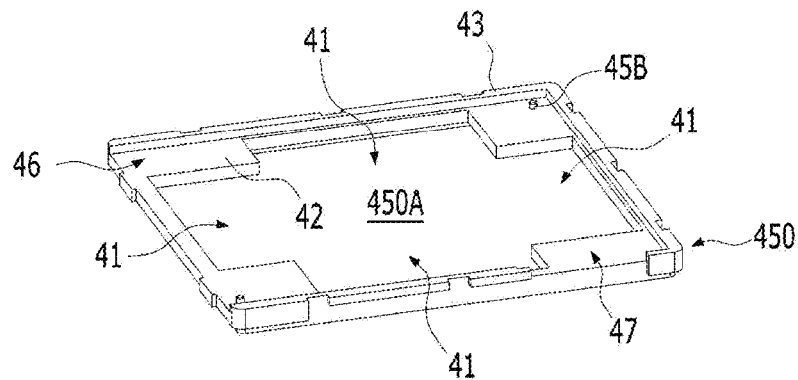

FIG.11
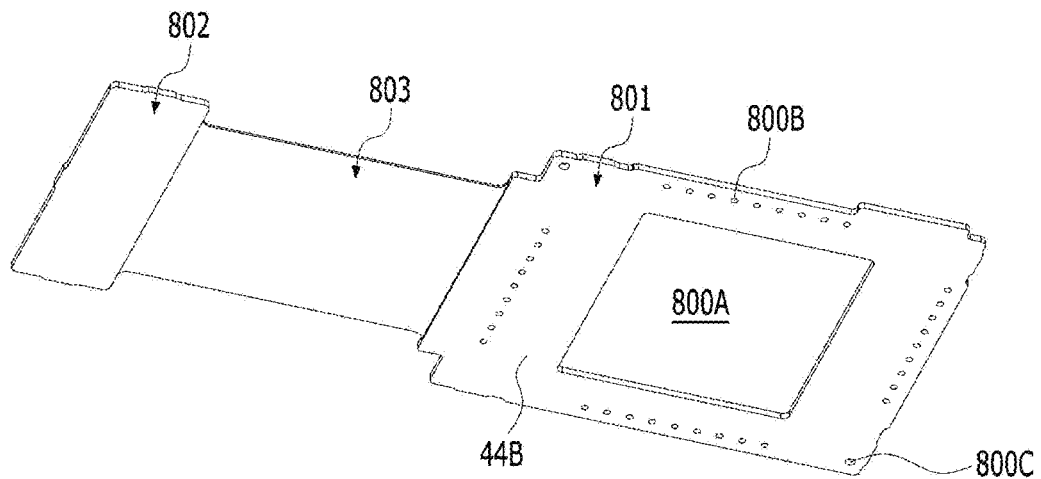
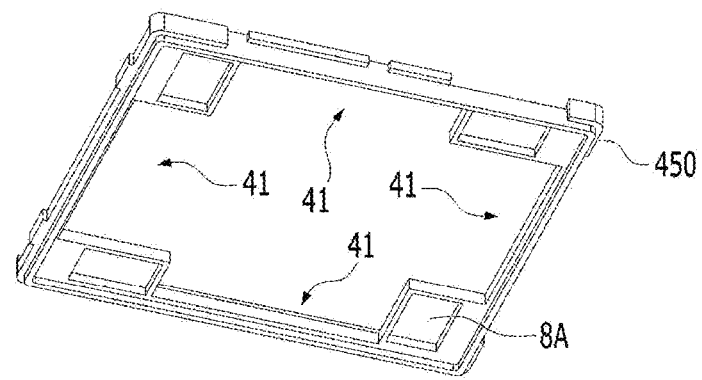
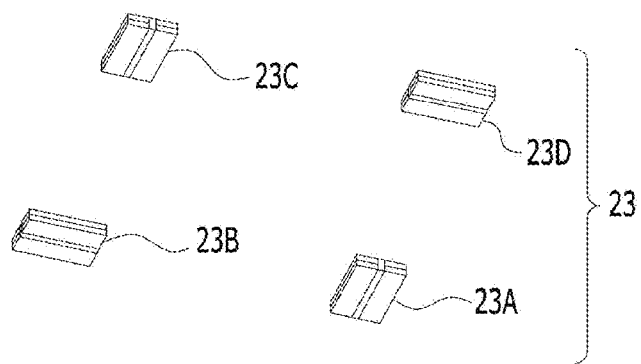

CAMERA MODULE AND OPTICAL DEVICE

CROSS-REFERENCE TO RELATED APPLICATIONS

This application is a continuation of U.S. application Ser. No. 17/756,135, filed May 18, 2022; which is the U.S. national stage application of International Patent Application No. PCT/KR2020/015137, filed Nov. 2, 2020, which claims the benefit under 35 U.S.C. § 119 of Korean Application No. 10-2019-0147581, filed Nov. 18, 2019, the disclosures of each of which are incorporated herein by reference in their entirety.

TECHNICAL FIELD

Embodiments relate to a camera module and an optical device including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

Embodiments provide a camera module and an optical device including the same, in which an image sensor is coupled to an integral connecting board and thus to a second circuit board, thereby simplifying a process of assembling a camera, reducing the number of soldering points in the signal path of the image sensor, and inhibiting the image sensor from becoming inoperable and suppressing image noise.

Technical Solution

In one embodiment, a camera module includes a housing, a first circuit board disposed on the housing, a magnet disposed on the housing, a holder spaced apart from the housing, a second circuit board coupled to the holder, a coil disposed on the second circuit board so as to be aligned with the magnet, a connecting board including a first terminal, an image sensor disposed on the connecting board, a support member coupled at one end thereof to the first circuit board, and a connective elastic member including a first coupler disposed on the holder and coupled to the first terminal, a second coupler coupled to a remaining end of the support member, and a connector connecting the first coupler to the second coupler.

The connective elastic member may be disposed on a second surface of the holder opposite a first surface of the holder that faces the second circuit board.

The support member may extend through the second circuit board and the holder.

The second circuit board may include a second terminal, and the connecting board may include a third terminal conductively connected to the second terminal of the second circuit board.

The second coupler may be spaced apart from the holder.

The connector may have a width smaller than any of a width of the first coupler and a width of the second coupler.

The first circuit board may have a first bore through which the image sensor is exposed, the second circuit board may have a second bore through which the image sensor is exposed, and the holder may have a third bore corresponding to the connecting board.

The first terminal of the connecting board may include a plurality of first terminals, the connective elastic member may include a plurality of connecting springs corresponding to the plurality of first terminals, the support member may include a plurality of support members corresponding to the plurality of connecting springs, and each of the plurality of connecting springs may include the first coupler, the second coupler, and the connector.

The connective elastic member may include a plurality of groups, and each of the plurality of groups may include a plurality of connecting springs.

The connecting board may include a plurality of first terminals corresponding to the plurality of connecting springs.

Each of the plurality of groups may be disposed on a corresponding one of side portions of the holder.

Each of the plurality of connecting springs may include the first coupler, the second coupler, and the connector.

The image sensor may be shifted or tilted in a direction perpendicular to an optical axis by virtue of interaction between the magnet and the coil, and the optical axis may be perpendicular to one surface of the image sensor.

The camera module may include a lens module disposed on the image sensor, and a filter disposed between the lens module and the image sensor. Furthermore, the camera module may include a filter holder coupled to a region of the connecting board around the image sensor, and the filter may be disposed on the filter holder.

Advantageous Effects

Embodiments are capable of simplifying a process of assembling a camera, reducing the number of soldering points in the signal path of the image sensor, and inhibiting the image sensor from becoming inoperable and suppressing image noise.

Furthermore, embodiments are capable of simplifying an assembly process and thus reducing tolerance stacking and of conveying advantages in managing alignment of the lens module.

In addition, embodiments are capable of conveying effects of reducing material costs and manufacturing costs by reducing the number of components and the number of processes.

DESCRIPTION OF DRAWINGS

FIG. 10 is a perspective view of the first circuit board and the housing shown in FIG. 9;

FIG. 11 is a perspective view of the first circuit board, the housing, and the magnet shown in FIG. 9;

BEST MODE

Figure 1:
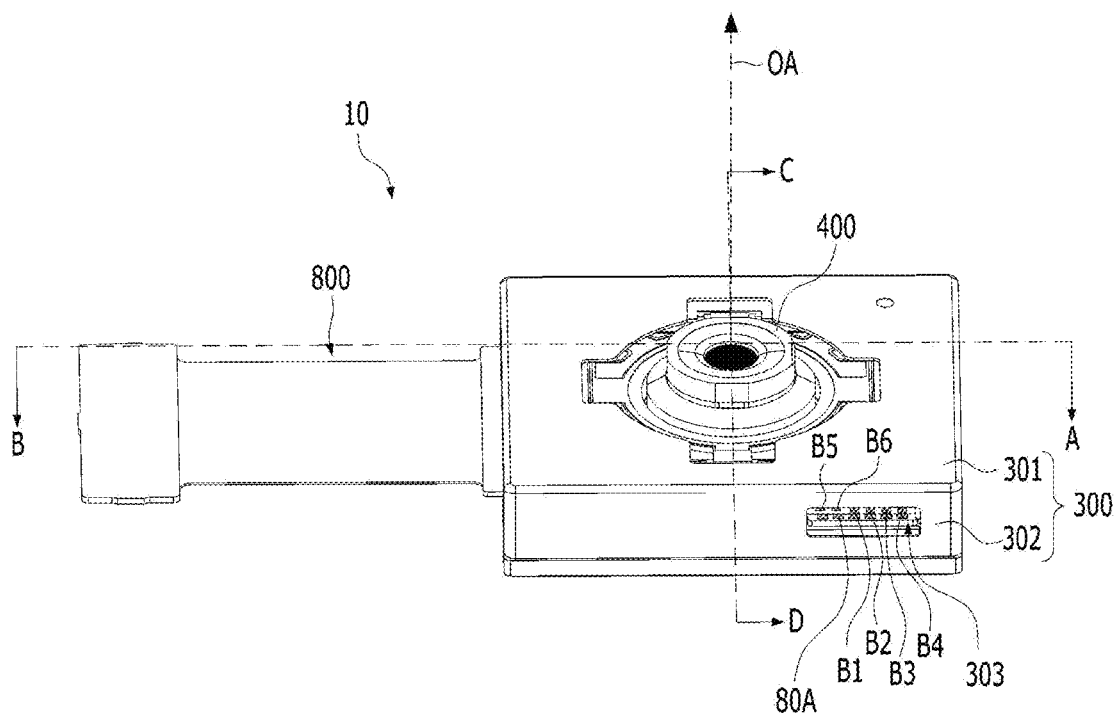
FIG. 1 is a perspective view of a camera module according to an embodiment of the present invention.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, an AF operation unit may be alternatively referred to as a "lens moving unit", a "VCM (Voice Coil Motor)", an "actuator" or a "lens moving device". Hereinafter, the term "coil" may be interchangeably used with "coil unit", and the term "elastic member" may be interchangeably used with "elastic unit" or "spring".

In the follow description, the "terminal" may be alternatively referred to as a "pad", "electrode", "conductive layer" or "bonding portion".

For the convenience of description, although the camera module according to an embodiment is described using a rectangular coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the direction of the optical axis OA, may be referred to as a "first direction", the X-axis direction may be referred to as a "second direction", and the Y-axis direction may be referred to as a "third direction".

The camera module according to an embodiment of the present invention is capable of performing an "auto-focusing function". Here, the "auto-focusing function" serves to automatically focus an image of a subject on an image sensor surface.

In addition, the camera module according to the embodiment may perform a function of "handshake correction". Here, the function of "handshake correction" may serve to inhibit the contour line of a captured image from being blurred due to vibration caused by shaking of the user's hand when capturing a still image.

Figure 2:
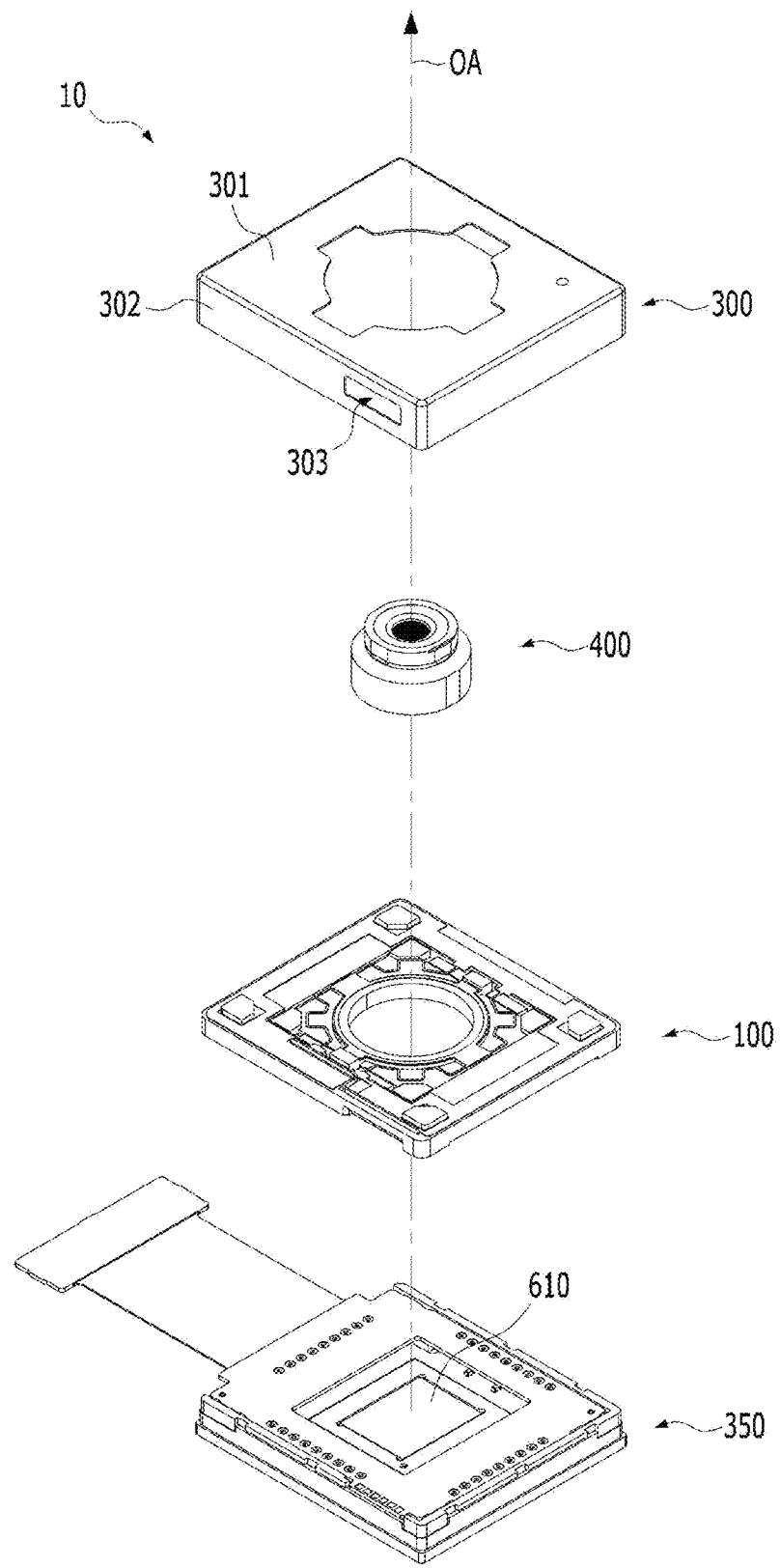
FIG. 2 is an exploded perspective view of the camera module shown in FIG. 1.
Figure 3:
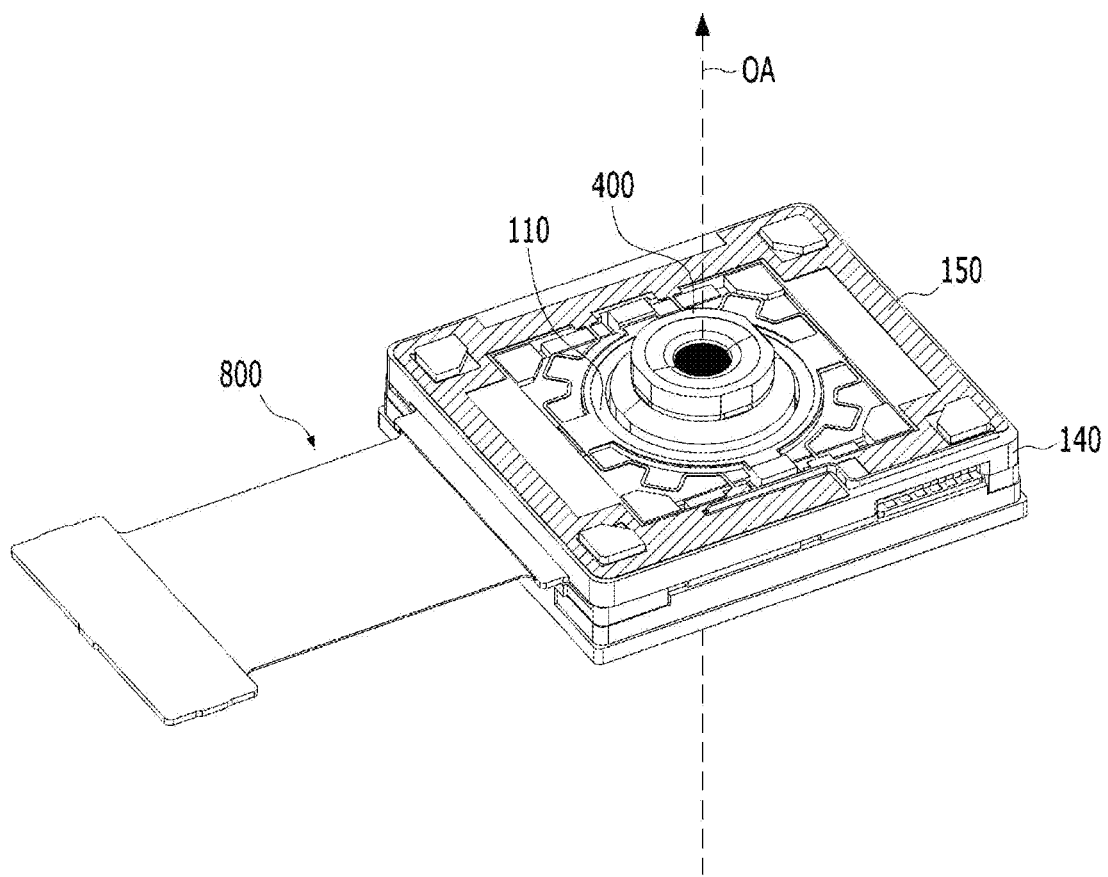
FIG. 3 is an assembled perspective view of the camera module shown in FIG. 1, from which a cover member is removed.
Figure 4:
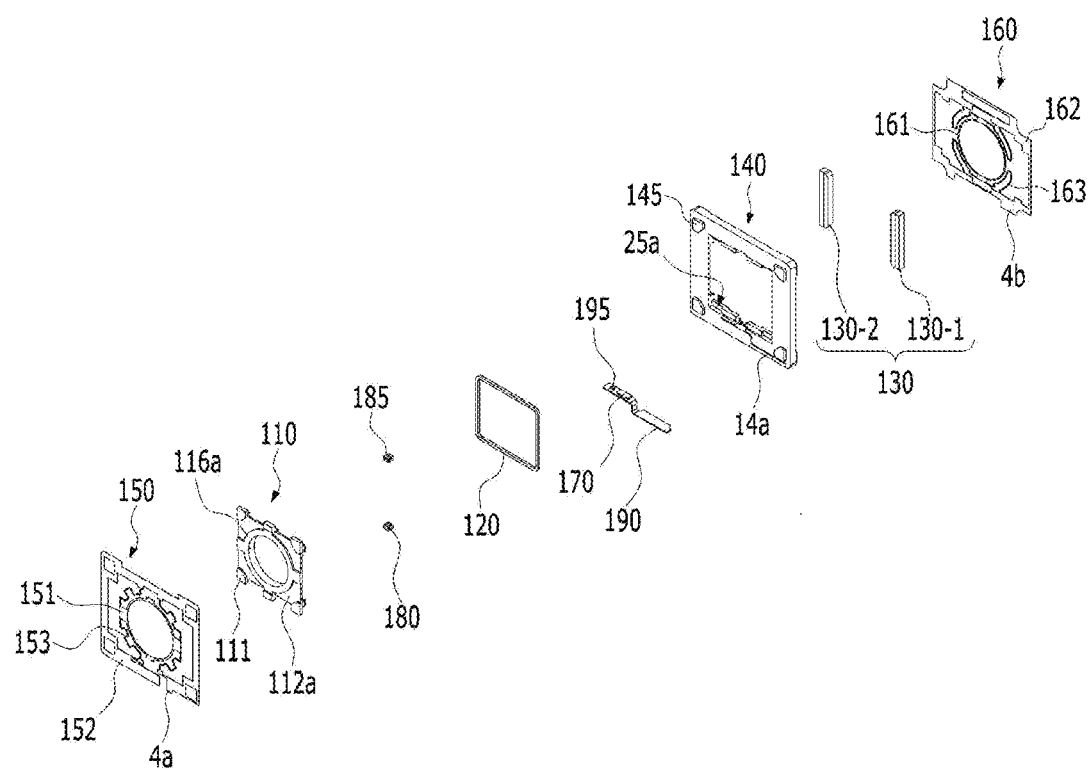
FIG. 4 is an exploded perspective view of the AF operation unit shown in FIG. 2.
Figure 5:
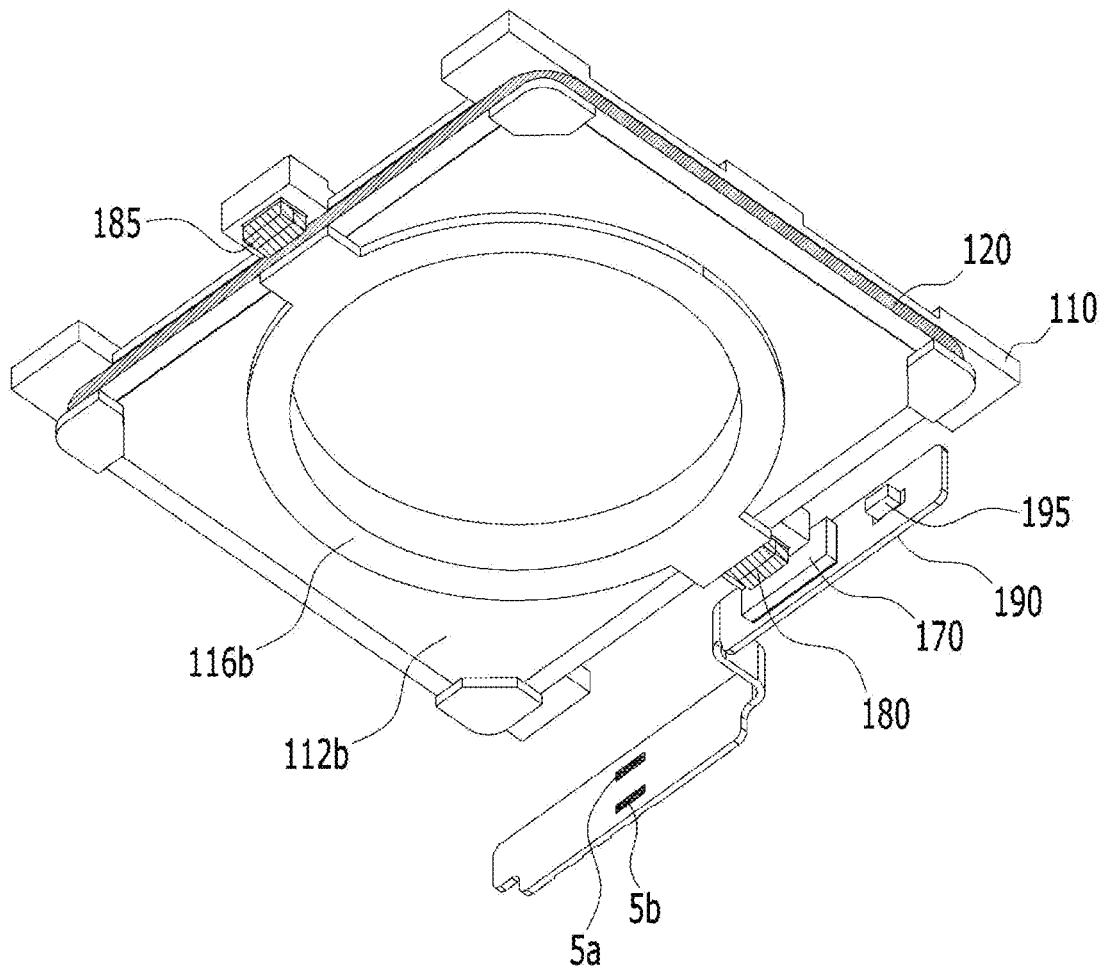
FIG. 5 is a perspective view of the bobbin, the sensing magnet, the balancing magnet, the first coil, the circuit board, the first position sensor, and the capacitor shown in FIG. 4.
Figure 6:
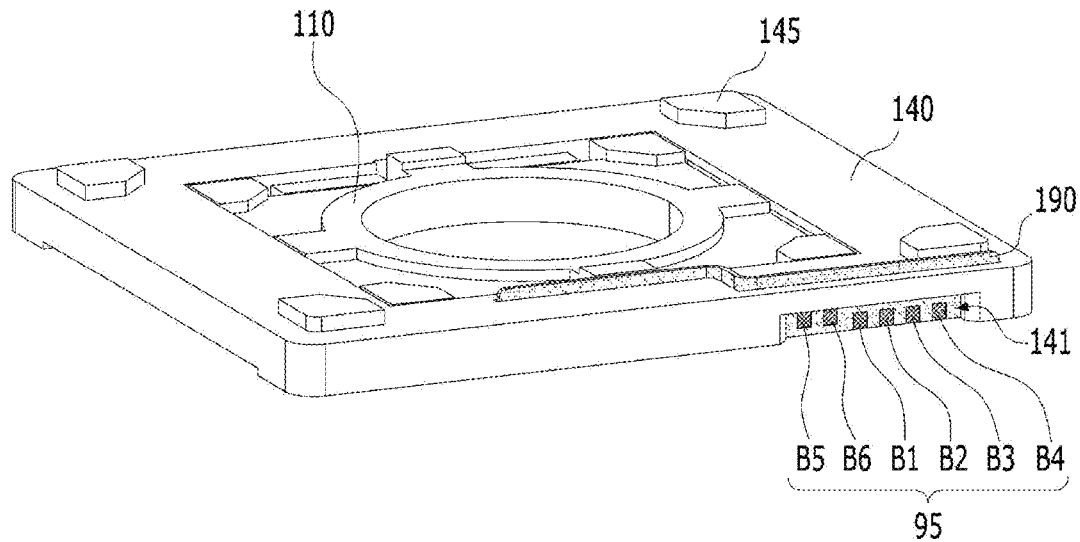
FIG. 6 is a perspective view of the bobbin, the housing, and the circuit board.
Figure 7:
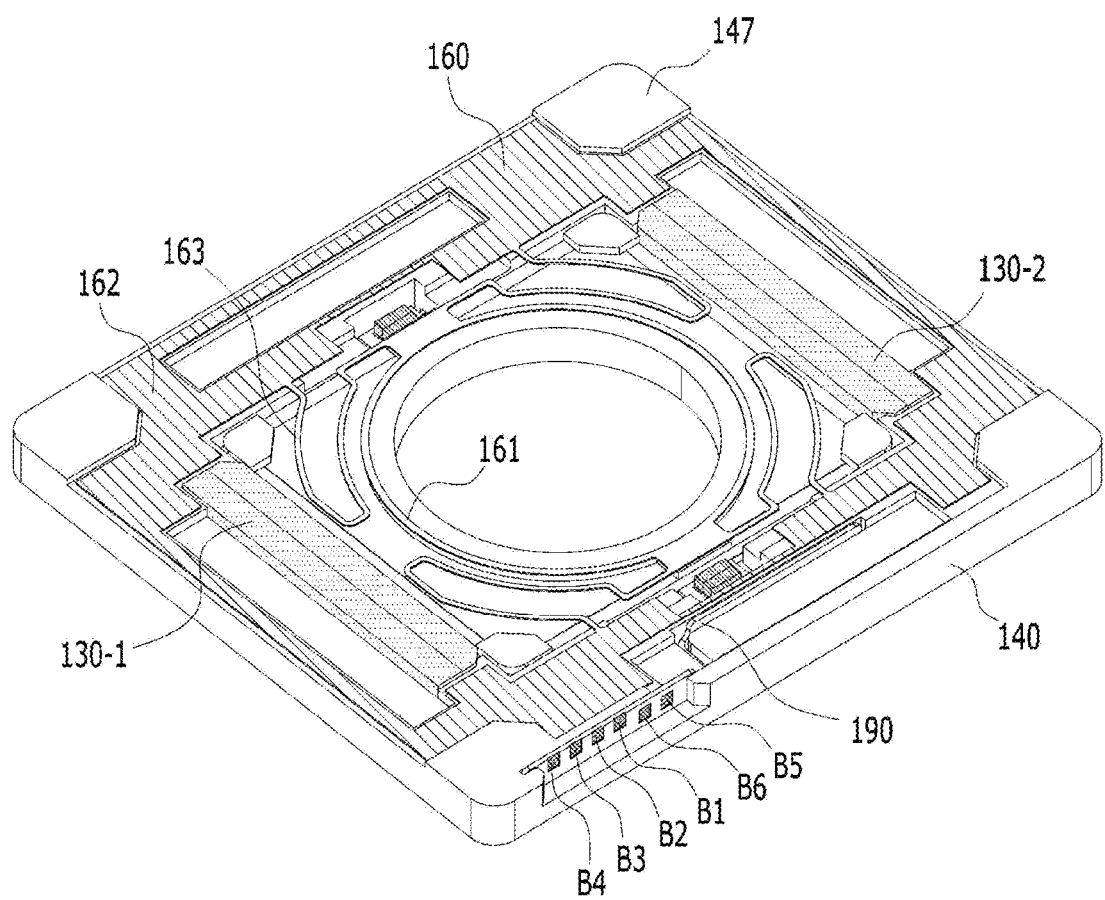
FIG. 7 is a bottom perspective view of the housing, the bobbin, the lower elastic member, the magnet, and the circuit board.

FIG. 1 is a perspective view of the camera module 10 according to the embodiment of the present invention. FIG. 2 is an exploded perspective view of the camera module 10 shown in FIG. 1. FIG. 3 is an assembled perspective view of the camera module shown in FIG. 1, from which a cover member 300 is removed. FIG. 4 is an exploded perspective view of the AF operation unit 100 shown in FIG. 2. FIG. 5 is a perspective view of the bobbin 110, the sensing magnet 180, the balancing magnet 185, the first coil 120, the circuit board 190, the first position sensor 170, and the capacitor 195 shown in FIG. 4. FIG. 6 is a perspective view of the bobbin 110, the housing 140, and the circuit board 190. FIG. 7 is a bottom perspective view of the housing 140, the bobbin 110, the lower elastic member 160, the magnet 130, and the circuit board 190.

Referring to FIGS. 1 to 7, the camera module 10 may include the AF operation unit 100 and an image sensor unit 350.

The camera module 10 may further include at least one of the cover member 300, a lens module 400, and a base 210. The cover member 300 and the base 210 may define the case.

The AF operation unit 100 may be coupled to the lens module 400, and may move the lens module 400 in the direction of the optical axis OA or in a direction parallel to the optical axis in order to perform an autofocusing function of the camera module 10.

The image sensor unit 350 may include an image sensor 810, and may move the image sensor 810 in a direction perpendicular to the optical axis or may tilt or rotate the image sensor 810 relative to the optical axis. The imager sensor unit 350 may perform a function of handshake correction.

For example, the image sensor 810 may be rotated about the x-axis, the y-axis, and the z-axis.

For example, the image sensor 810 may be moved along the x-axis direction, the y-axis direction, and the z-axis direction.

For example, the image sensor 440 may be tilted relative to the x-axis, the y-axis, and the z-axis.

The AF operation unit 100 may be alternatively referred to as a "lens moving unit" or a "lens moving apparatus". Alternatively, the AF operation unit 100 may be alternatively referred to as a "first actuator" or an "AF operation drive unit".

The image sensor unit 350 may be alternatively referred to as an "image-sensor moving unit" or an "image-sensor shift unit", a "sensor moving unit" or a "sensor shift unit". Alternatively, the image sensor unit 350 may be alternatively referred to as a "second actuator" or an "OIS drive unit".

Referring to FIG. 4, the AF operation unit 100 may include the bobbin 110, the first coil 120, the magnet 130, and the housing 140.

The AF operation unit 100 may further include the upper elastic member 150 and the lower elastic member 160.

The AF operation unit 100 may include a first position sensor 170, the circuit board 190, and the sensing magnet 180 for AF feedback operation. The AF operation unit 100 may further include at least one of the balancing magnet 185 and the capacitor 195.

The bobbin 110 may be disposed in the housing 140 so as to be movable in the optical-axis direction OA or the first direction (for example, the Z-axis direction) by the electromagnetic interaction between the first coil 120 and the magnet 130.

The bobbin 110 may have a bore to which a lens module 400 is coupled or mounted. For example, the bore in the bobbin 110 may be a through hole formed through the bobbin 110 in the optical-axis direction, and may have a circular shape, an elliptical shape or a polygonal shape, without being limited thereto.

The lens module 400 may include at least one lens and/or a lens barrel.

For example, the lens module 400 may include at least one lens and a lens barrel receiving the at least one lens. However, the configuration of the lens module is not limited to the lens barrel, and the lens module may have any configuration, as long as the configuration is capable of supporting the at least one lens.

For example, the lens module 400 may be threadedly engaged with the bobbin 110. Alternatively, the lens module 400 may be coupled to the bobbin 110 using, for example, an adhesive (not shown). The light that has passed through the lens module 400 may be radiated to the image sensor 810 through a filter 610.

The bobbin 110 may include a projection 111 provided on the outer surface thereof.

For example, although the projection 111 may project in a direction that is parallel to a line perpendicular to the optical axis OA, but the disclosure is not limited thereto.

The projection 111 of the bobbin 110 may correspond to a groove 25a in the housing 140, and may be disposed in the groove 25a in the housing 140 so as to minimize or inhibit rotation of the bobbin 110 about the optical axis beyond a predetermined range. Furthermore, the projection 111 may serve as a stopper configured to cause the bobbin 110 to move within a predetermined range in the optical-axis direction (for example, in a direction toward the lower elastic member 160 from the upper elastic member 150) in response to an external impact or the like.

The bobbin 110 may have formed in the upper surface thereof a first escape groove 112a for avoiding spatial interference with a first frame connector 153 of the upper elastic member 150. The bobbin 110 may have formed in the lower surface thereof a second escape groove 112b for avoiding spatial interference with a second frame connector 163 of the lower elastic member 160.

The bobbin 110 may include a first coupler 116a, configured to be coupled and fixed to the upper elastic member 150. For example, although the first coupler 116a of the bobbin 110 may have a flat shape, the disclosure is not limited thereto. In another embodiment, the first coupler 116a of the bobbin 110 may have the shape of a protrusion or a groove.

The bobbin 110 may include a second coupler 116b configured to be coupled and fixed to the lower elastic member 160. For example, although the second coupler 116b may have a flat shape, the disclosure is not limited thereto. In another embodiment, the second coupler 116b may have the shape of a protrusion or a groove.

Referring to FIG. 5, the outer surface of the bobbin 110 may have formed therein a groove in which the first coil 120 is seated, fitted or disposed. The groove in the bobbin 110 may have a shape corresponding to the shape of the first coil 120, that is, a closed curve shape (for example, a ring shape).

The bobbin 110 may be provided therein with a first seating groove in which the sensing magnet 180 is seated, fitted, fixed, or disposed. Furthermore, the bobbin 110 may be provided in the outer surface thereof with a second seating groove in which the balancing magnet 185 is seated, fitted, fixed or disposed. For example, the first and second seating grooves in the bobbin 110 may be formed in outer surfaces of the bobbin 110 that are opposite each other.

The first coil 120 may be disposed at the bobbin 110, or may be coupled to the bobbin 110. For example, the first coil 120 may be disposed on the outer surface of the bobbin 110.

The first coil 120 may surround the outer surface of the bobbin 110 about the optical axis OA in a winding direction, without being limited thereto.

Although the first coil 120 may be directly wound around the outer surface of the bobbin 110, the disclosure is not limited thereto. In another embodiment, the first coil 120 may be embodied as a coil ring, which is wound around the bobbin 110, or as a coil block having an angled shape.

A power or drive signal may be supplied to the coil 120.

The power or drive signal supplied to the first coil 120 may be a DC signal, an AC signal or a signal containing both DC and AC components, and may be of a voltage type or a current type.

When a drive signal (for example, drive current) is supplied to the first coil 120, it is possible to create electromagnetic force resulting from the electromagnetic interaction with the first magnet, thereby moving the bobbin 110 in the direction of the optical axis OA by virtue of the created electromagnetic force.

At the initial position of the AF operation unit, the bobbin 110 may be moved upwards or downwards, which is referred to as bidirectional driving of the AF operation unit. Alternatively, at the initial position of the AF operation unit, the bobbin 110 may be moved upwards, which is referred to as unidirectional driving.

At the initial position of the AF operation unit, the first coil 120 may be disposed so as to correspond to the magnet 130 disposed at the housing 140 in a direction parallel to a line which is perpendicular to the optical axis OA and extends through the optical axis.

For example, the AF operation unit may include the bobbin 110 and the components (for example, the first coil 120, the sensing magnet 180 and the balancing magnet 185) coupled to the bobbin 110. The AF operation unit may further include the lens module 400.

The initial position of the AF operation unit may be the original position of the AF operation unit in the state in which no electric power is applied to the first coil 120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 to the base 210 or when gravity acts in the direction from the base 210 to the bobbin 110.

The sensing magnet 180 may provide a magnetic field, which is detected by the first position sensor 170, and the balancing magnet 185 may serve to cancel out the influence of the magnetic field of the sensing magnet 180, and establishes weight equilibrium with respect to the sensing magnet 180.

The sensing magnet 180 may be alternatively referred to as a "sensor magnet".

The sensing magnet 180 may be disposed at the bobbin 110, or may be coupled to the bobbin 110.

The sensing magnet 180 may be disposed so as to face the first position sensor 170.

The balancing magnet 185 may be disposed at the bobbin 110, or may be coupled to the bobbin 110. For example, the balancing magnet 185 may be disposed opposite the sensing magnet 180.

Although each of the sensing magnet and the balancing magnet 180 and 185 may be a monopolar magnetized magnet having one N pole and one S pole, the disclosure is not limited thereto. In another embodiment, each of the sensing magnet and the balancing magnet 180 and 185 may be a bipolar magnetized magnet, which has two N poles and two S poles, or a tetrapolar magnetized magnet.

The sensing magnet 180 may be moved together with the bobbin 110 in the optical-axis direction, and the first position sensor 170 may detect the intensity or magnetic force of the magnetic field of the sensing magnet 180, which is moved in the optical-axis direction, and may output an output signal corresponding to the result of the detection.

For example, in accordance with displacement of the bobbin 110 in the optical-axis direction, the intensity or magnetic force of the magnetic field detected by the first position sensor 170 may vary. Consequently, the first position sensor 170 may output an output signal proportional to the detected intensity of the magnetic field, and the displacement of the bobbin 110 in the optical-axis direction may be detected using the output signal from the first position sensor 170.

The housing 140 accommodates therein the bobbin 110, and supports the magnet 130, the first position sensor 170, and the circuit board 190.

Referring to FIGS. 4, 6 and 7, the housing 140 may be configured to have a hollow column overall. For example, the housing 140 may have a polygonal (for example, a rectangular or octagonal) or circular bore, and the bore in the housing 140 may be a through hole, which is formed through the housing 140 in the optical-axis direction.

The housing 140 may include side portions, which correspond to or face the side plate 302 of the cover member 300, and corners, which correspond to or face the corners of the cover member 300.

In order to inhibit a direct collision with the inner surface of the upper plate 301 of the cover member 300, the housing 140 may include a stopper 145 provided at the upper portion, the upper surface or the upper end thereof.

In order to inhibit the lower surface of the housing 140 from colliding with the circuit board 800 of the image sensor 350, the housing 140 may further include a stopper 147 projecting from the lower surface thereof. Here, the stopper 145 or 147 may be alternatively referred to as a "boss" or a "protrusion".

Referring to FIG. 4, the housing 140 may have a mounting groove (or a seating groove) 14a configured to receive the circuit board 190 therein. The mounting groove 14a may have a shape corresponding to the shape of the circuit board 190.

Referring to FIG. 6, the housing 140 may have an opening 141 through which terminals B1 to B6 of a terminal member 95 of the circuit board 190 are exposed. The opening 141 may be formed in the side portion of the housing 140.

The upper portion, the upper end or the upper surface of the housing 140 may be provided with at least one first coupler, which is to be coupled to a first outer frame 152 of the upper elastic member 150.

The lower portion, the lower end or the lower surface of the housing 140 may be provided with a second coupler, which is to be coupled and fixed to a second outer frame 162 of the lower elastic member 160. For example, each of the first and second couplers of the housing 140 may have the shape of a protrusion, a groove, or a flat surface.

The magnet 130 may be disposed at the housing 140. For example, the magnet 130 may be disposed at the side portion of the housing 140. The magnet 130 may be an AF operation magnet for AF operation.

For example, although the magnet 130 may include first and second magnets, which are disposed at two side portions, which are positioned opposite each other, the disclosure is not limited thereto. In another embodiment, the magnet 130 may be disposed at the corner of the housing 140.

The magnet 130 may include two or more magnets.

At the initial position of the AF operation unit, the first magnet 130 may be disposed at the housing so as to partially overlap the first coil 120 in a direction parallel to a line which is perpendicular to the optical axis OA and extends through the optical axis OA.

Although each of the first and second magnets 130-1 and 130-2 may be a monopolar magnetized magnet, the disclosure is not limited thereto. In another embodiment, each of the first and second magnets 130-1 and 130-2 may be a bipolar magnetized magnet, which has two N poles and two S poles, or a tetrapolar magnetized magnet.

The circuit board 190 may be disposed at the housing 140, and the first position sensor 170 may be disposed at or mounted to the circuit board 190. For example, the circuit board 190 may be disposed in the mounting groove 14a in the housing 140, and the terminals of the circuit board 190 may be exposed to the outside of the housing 140 through the opening 141 in the housing 140.

The circuit board 190 may include the terminal member (or terminal unit) 95 including the plurality of terminals B1 to B6, which are to be conductively connected to external terminals or external devices, and the plurality of terminals B1 to B6 may be conductively connected to the first position sensor 170.

The first position sensor 170 may be disposed on a first surface of the circuit board 190, and the plurality of terminals B1 to B6 may be disposed on a second surface of the circuit board 190. Here, the second surface of the circuit board 190 may be the surface opposite the first surface of the circuit board 190. For example, the first surface of the circuit board 190 may be the surface of the circuit board 190 that faces the bobbin 110 or the sensing magnet 180.

For example, the circuit board 190 may be embodied as a printed circuit board or an FPCB.

The circuit board 190 may include a circuit pattern or a wire (not shown) for conductively connecting the first to sixth terminals B1 to B6 to the first position sensor 170.

The first position sensor 170 may detect the magnetic field or the intensity of the magnetic field of the sensing magnet 180 mounted on the bobbin 110 during movement of the bobbin 110, and may output an output signal corresponding to the result of the detection.

The first position sensor 170 may be a Hall sensor. The first position sensor 170 may include two input terminals, to which drive signals or power are supplied, and two output terminals, through which a sensing voltage (or an output voltage) is output.

For example, drive signals may be supplied to the first position sensor 170 through the first and second terminals B1 and B2 of the circuit board 190, and the output of the first position sensor 170 may be output to the outside through the third and fourth terminals B3 and B4.

The fifth and sixth terminals B5 and B6 of the circuit board 190 may be conductively connected to at least one of the upper elastic member 150 and the lower elastic member 160 so as to supply drive signals to the first coil 120.

In another embodiment, the first position sensor 170 may include a Hall sensor and a driver. Here, the first position sensor 170 may include the first to fourth terminals, through which data is transmitted to and received from the outside through data communication using a protocol such as, for example, I2C communication, and the fifth and sixth terminals, through which drive signals are directly supplied to the first coil 120. The first to fourth terminals of the first position sensor 170 may be conductively connected to the first to fourth terminals B1 to B4 of the circuit board 190. The fifth and sixth terminals of the first position sensor 170 may be conductively connected to the first coil 120 through at least one of the upper elastic member 150 and the lower elastic member 160 so as to supply drive signals to the first coil 120.

The capacitor 195 may be configured to have a chip shape. Here, the chip may include a first terminal, which corresponds to one end of the capacitor 195, and a second terminal, which corresponds to the other end of the capacitor 195. The capacitor 195 may be alternatively referred to as a "capacitive element" or "condenser".

The capacitor 195 may be conductively connected in parallel to first and second terminals B1 and B2 of the circuit board 190 through which power (or a drive signal) is supplied to the position sensor 170 from the outside. Alternatively, the capacitor 195 may be conductively connected in parallel to the terminals of the first position sensor 170, which is conductively connected to the first and second terminals B1 and B2 of the circuit board 190.

Since the capacitor 195 is conductively connected in parallel to the first and second terminals B1 and B2 of the circuit board 190, the capacitor 195 is capable of serving as a smoothing circuit for eliminating ripple components included in the power signals GND and VDD, which are supplied to the first position sensor 170 from the outside, and is thus capable of supplying stable and consistent power signals to the first position sensor 170.

The upper elastic member 150 may be coupled to the upper portion, the upper end or the upper surface of the bobbin 110 and the upper portion, the upper end or the upper surface of the housing 140, and the lower elastic member 160 may be coupled to the lower portion, the lower end or the lower surface of the bobbin 110 or the upper portion, the upper end or the upper surface of the housing 140.

The upper elastic member 150 and the lower elastic member 160 may elastically support the bobbin 110 with respect to the housing 140.

In FIG. 4, although each of the upper elastic member 150 and the lower elastic member 160 are embodied as a single unit or a single structure in FIG. 4, the disclosure is not limited thereto.

In another embodiment, at least one of the upper elastic member and the lower elastic member may include a plurality of elastic units or springs, which are conductively isolated or spaced apart from each other.

The upper elastic member 150 may further include a first inner frame 151 coupled or fixed to the upper portion, the upper surface or the upper end of the bobbin 110, a first outer frame 152 coupled or fixed to the upper portion, the upper surface or the upper end of the housing 140, and a first frame connector 153 connecting the first inner frame 151 to the first outer frame 152.

The lower elastic member 160 may include a second inner frame 161 coupled or fixed to the lower portion, the lower surface or the lower end of the bobbin 110, a second outer frame 162 coupled or fixed to the lower portion, the lower surface or the lower end of the housing 140, and a second frame connector 163 connecting the second inner frame 161 to the second outer frame 162.

Each of the first and second frame connectors 153 and 163 may be bent or curved (or may be formed into a curved line) at least once so as to define a predetermined pattern.

Each of the upper elastic member 150 and the lower elastic member 160 may be made of a conductive material.

Referring to FIGS. 4 and 5, two pads 5a and 5b may be formed on the first surface of the circuit board 190, and may be conductively connected to the fifth and sixth terminals B5 and B6 of the circuit board 190. The upper elastic member 150 may include a first bonding portion 4a, which is to be coupled or conductively connected to the first pad 5a, and the lower elastic member 160 may include a second bonding portion 4b, which is to be conductively connected to the second pad 5b. The first coil 120 may be coupled at one end thereof to the upper elastic member 150 and at the other end thereof to the lower elastic member 160.

In a further embodiment, the upper elastic member 150 or the lower elastic member 160 may include two lower elastic members, and each of the two elastic members may be coupled or conductively connected to a corresponding one of the first and second pads 5a and 5b of the circuit board 190. The first coil 120 may be conductively connected to the two elastic members.

Although the coil 120 is shown as being disposed at the bobbin 110 and the first magnet 130 is shown as being disposed at the housing 140 in FIG. 4, the coil may be disposed at the housing and the first magnet may be disposed at the bobbin in another embodiment. In a further embodiment, the sensing magnet may be disposed at the housing, and the first position sensor 170 and/or the circuit board 190 may be disposed at the bobbin.

Figure 8:
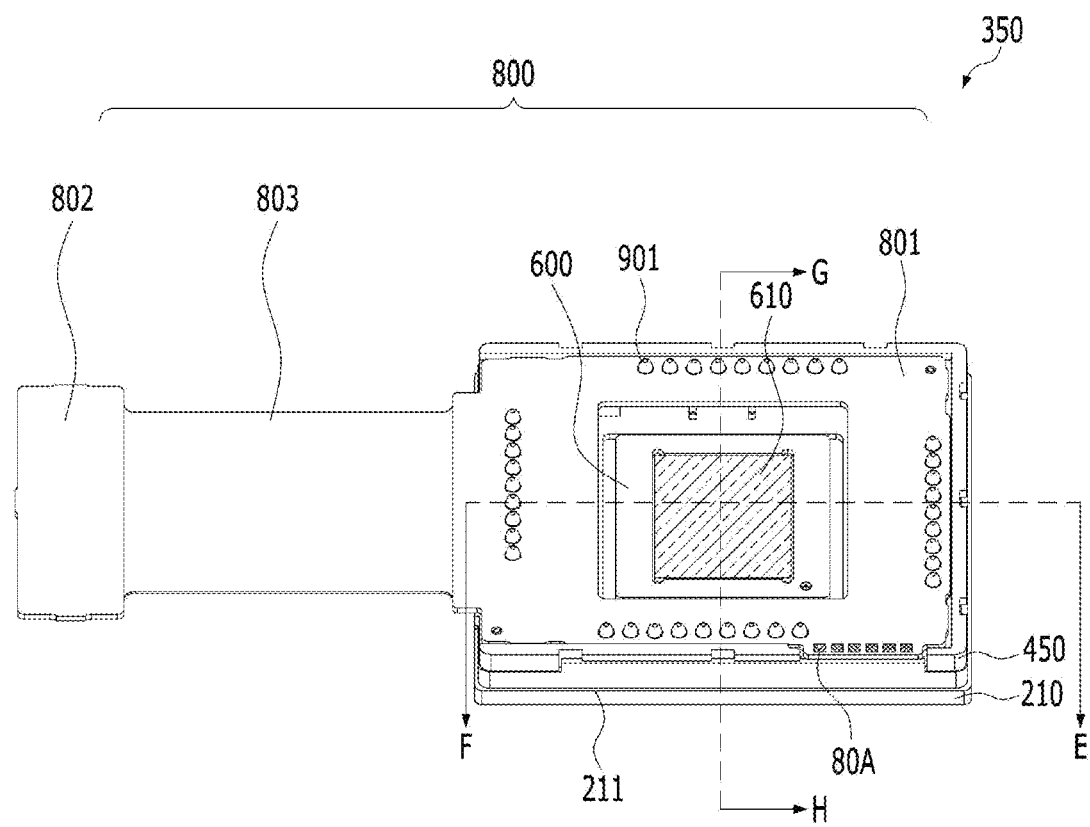
FIG. 8 is a plan view of the image sensor unit shown in FIG. 2.
Figure 9:
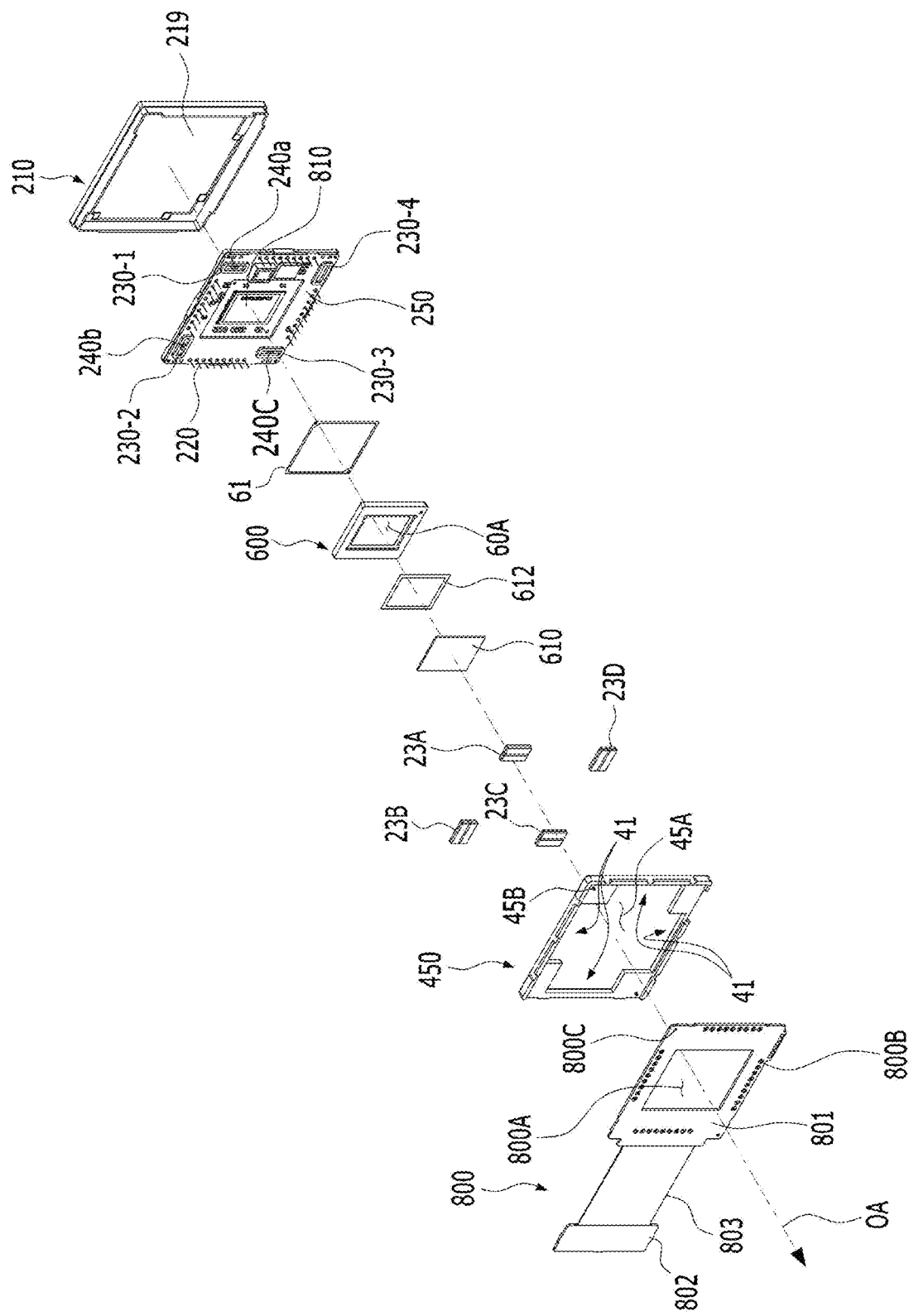
FIG. 9 is an exploded perspective view of the image sensor unit shown in FIG. 8.
Figure 12:
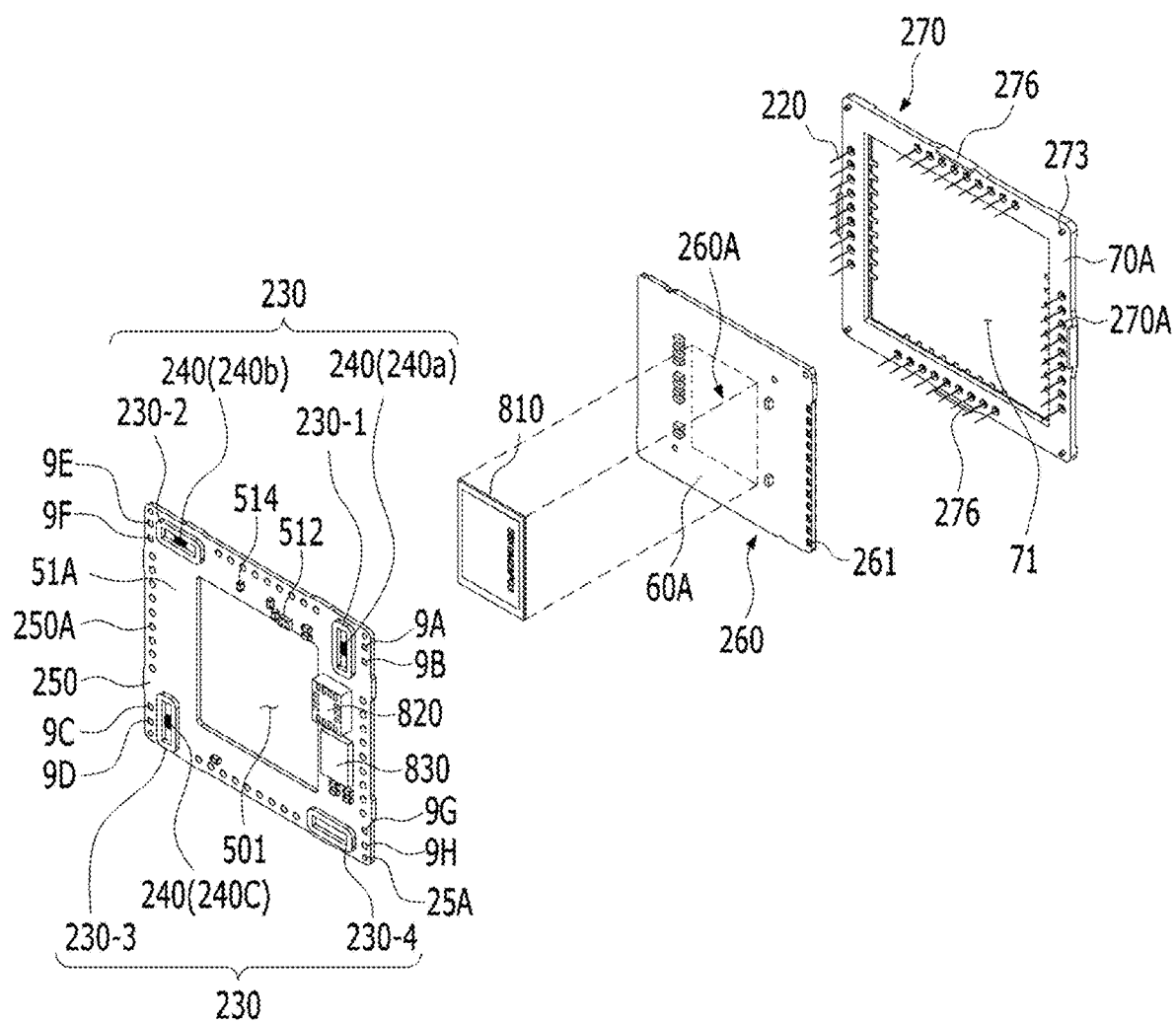
FIG. 12 is an exploded perspective view of a second circuit board, a second coil, a second position sensor, an image sensor, a connecting board, a support member, and a holder.
Figure 13:
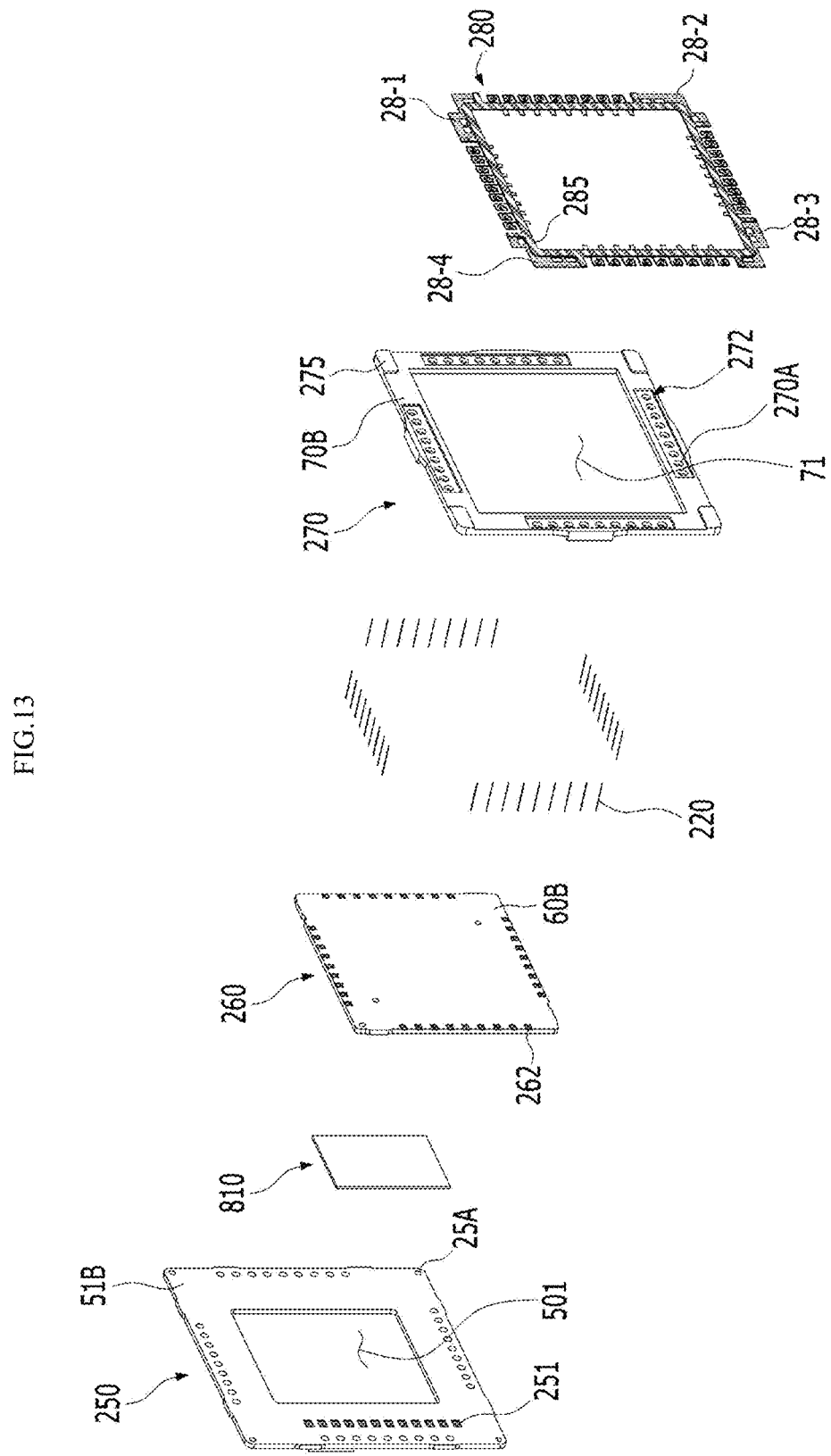
FIG. 13 is an exploded perspective view of the second circuit board, the image sensor, the connecting board, the support member, the holder, and the connective elastic member, which are shown in FIG. 9.
Figure 14:
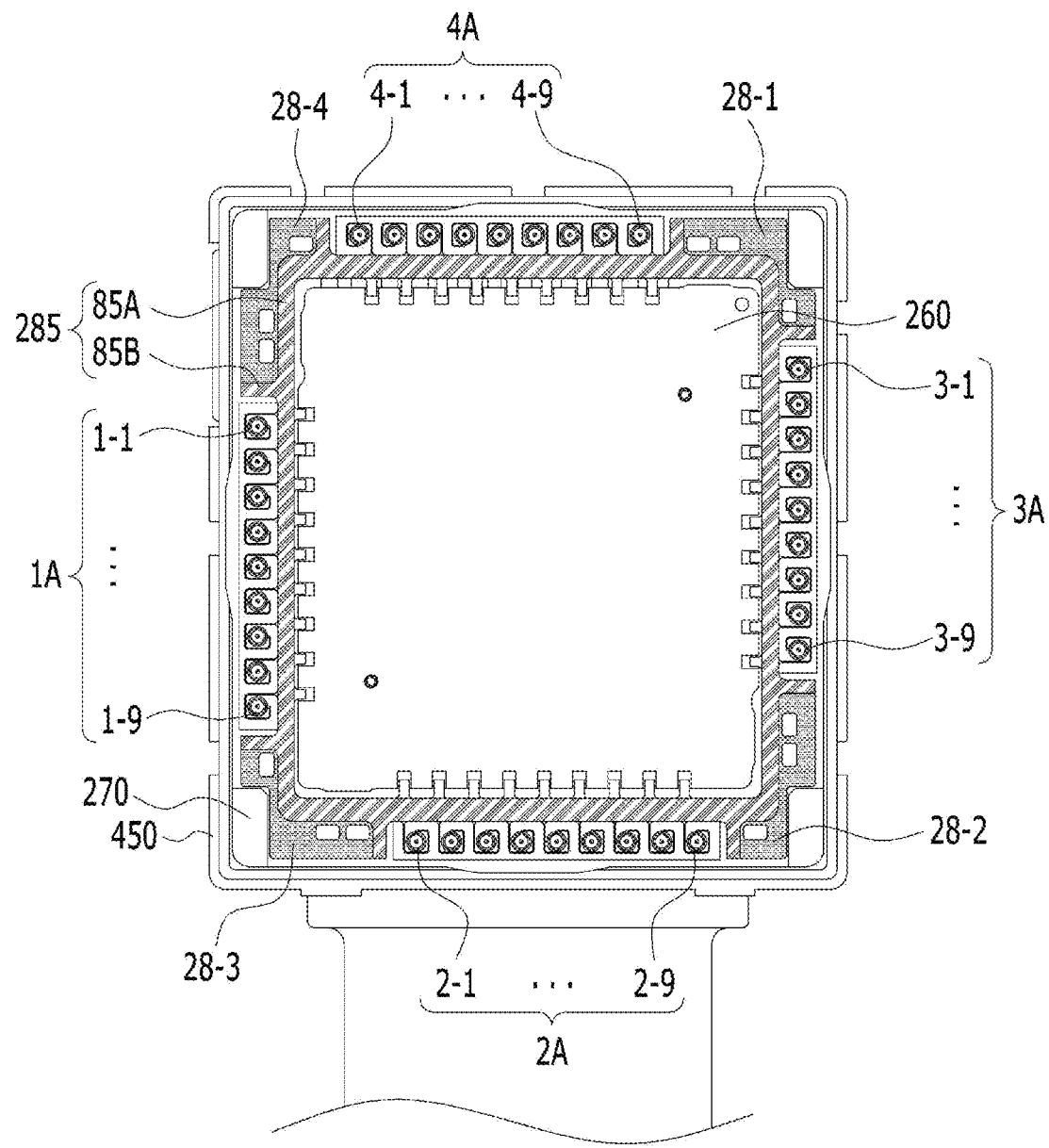
FIG. 14 is a bottom view of the image sensor unit shown in FIG. 8 from which a bottom cover is removed.
Figure 15:
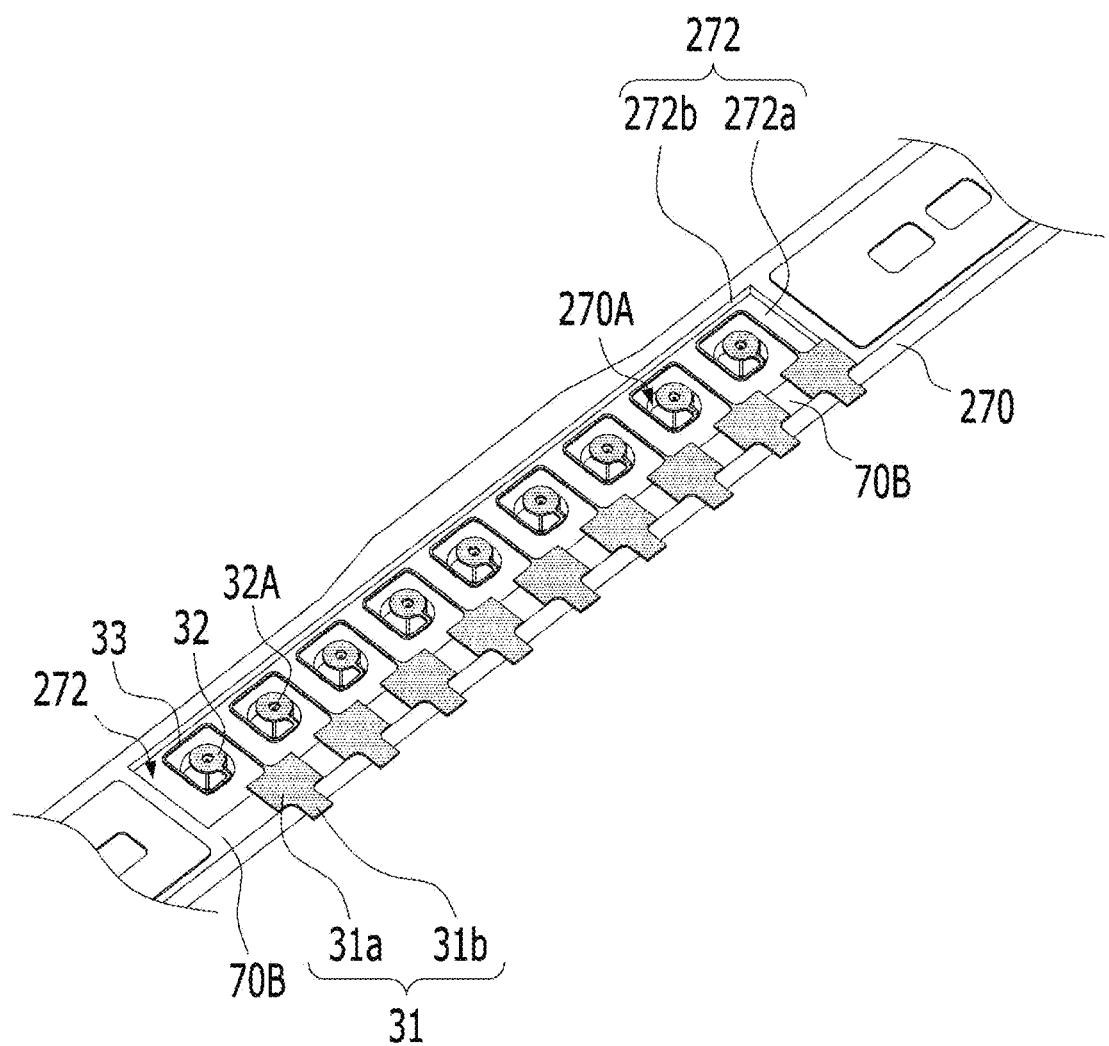
FIG. 15 is a fragmentary enlarged view of the connective elastic member.
Figure 16:
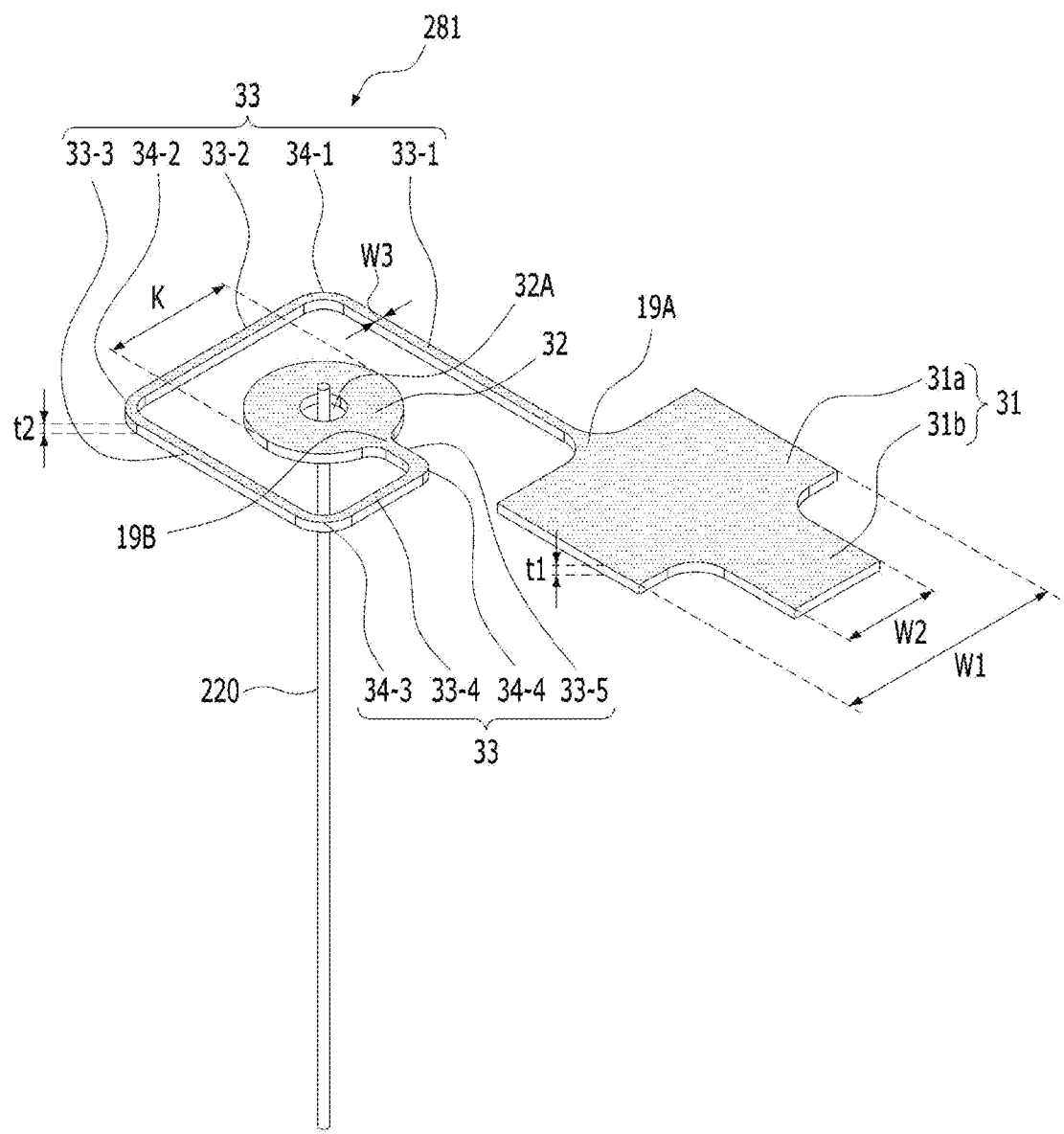
FIG. 16 is a bottom view of a single connecting spring.
Figure 17:
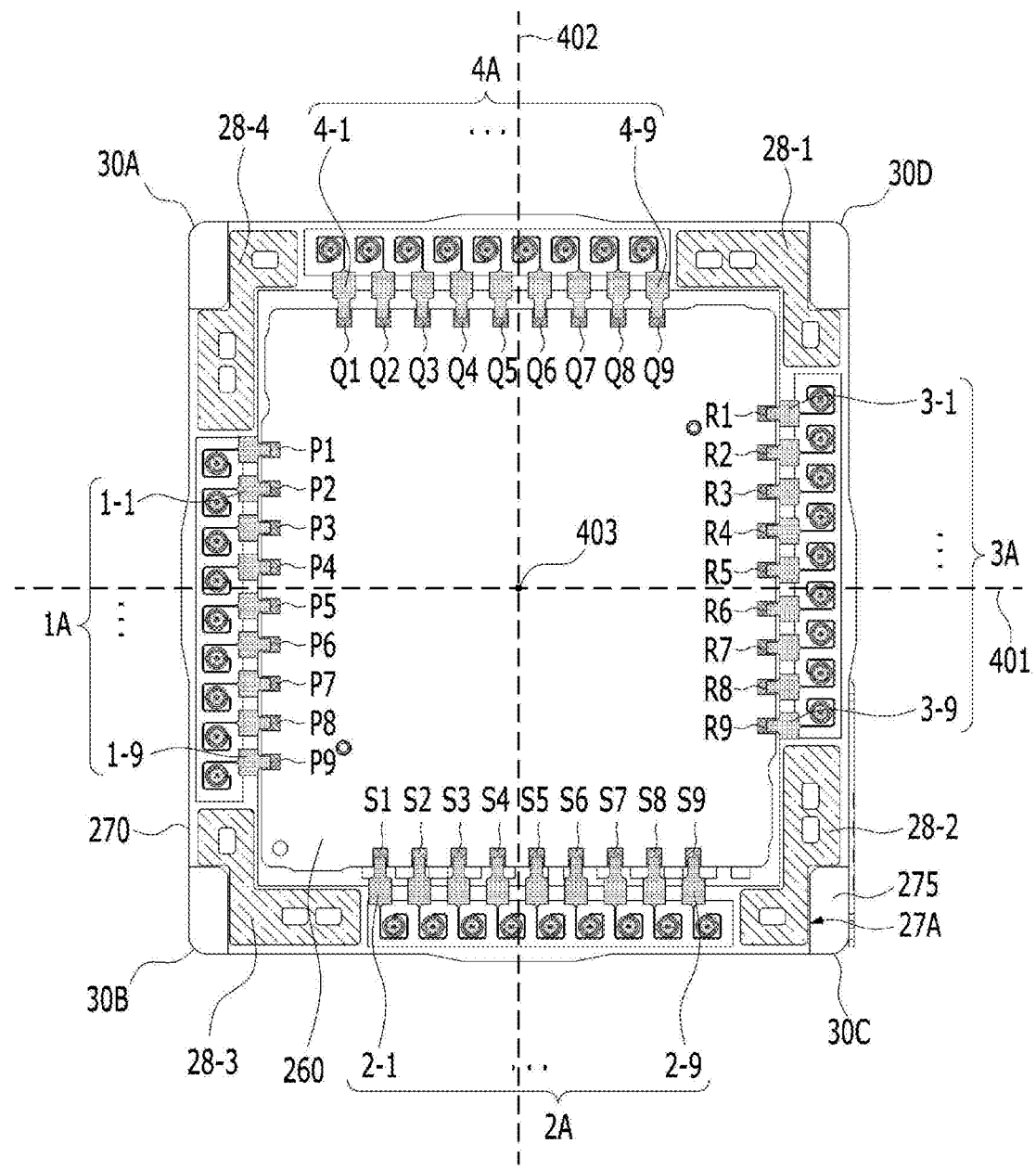
FIG. 17 is a view illustrating connecting springs of the connective elastic member.
Figure 18:
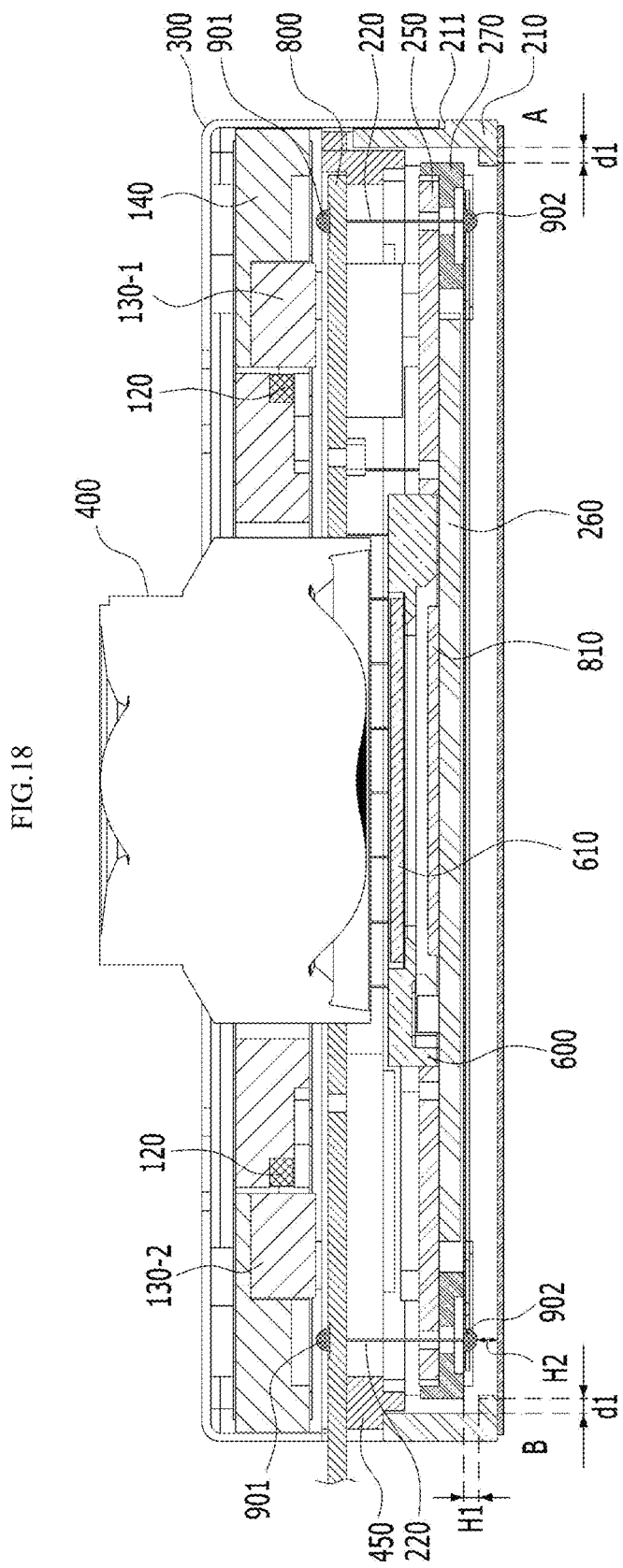
FIG. 18 is a cross-sectional view taken along line A-B of the camera module shown in FIG. 1.
Figure 19:
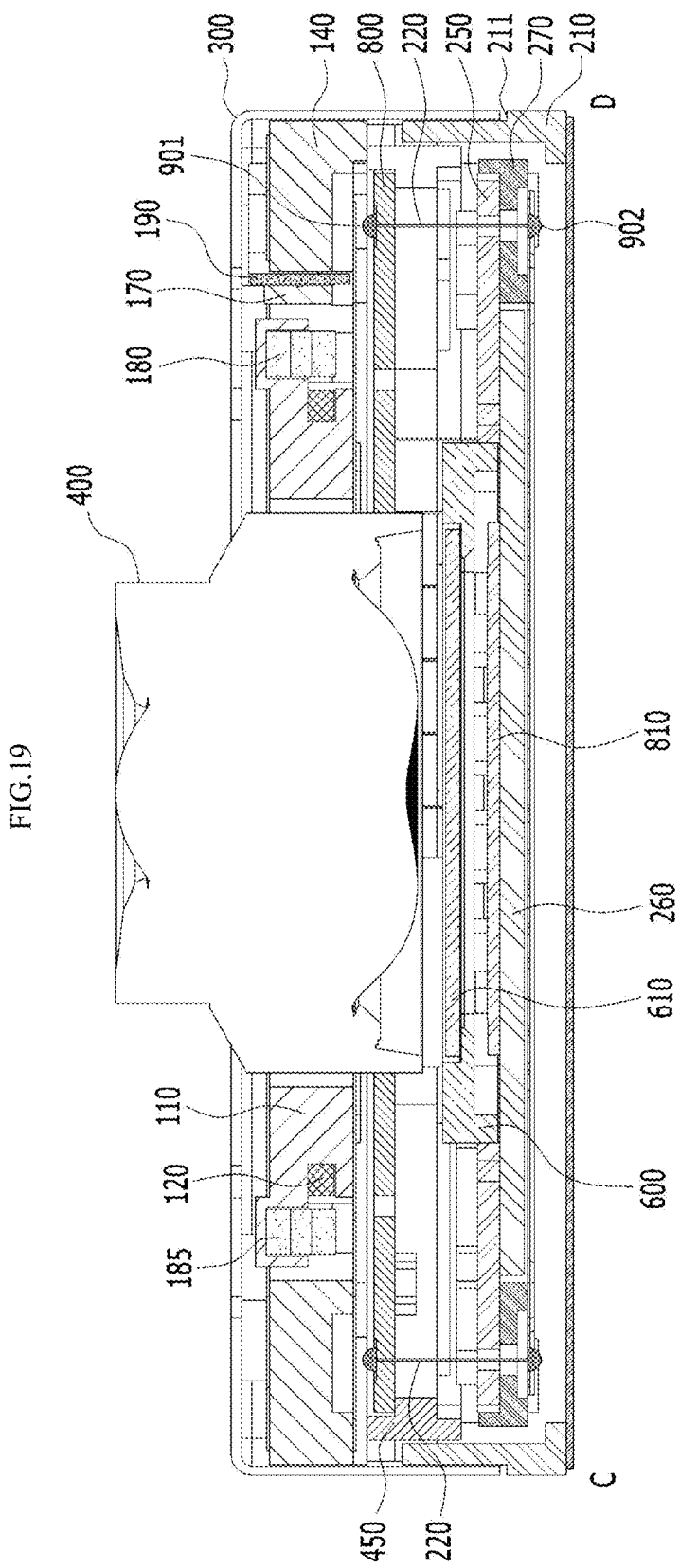
FIG. 19 is a cross-sectional view taken along line C-D of the camera module shown in FIG. 1.
Figure 20:
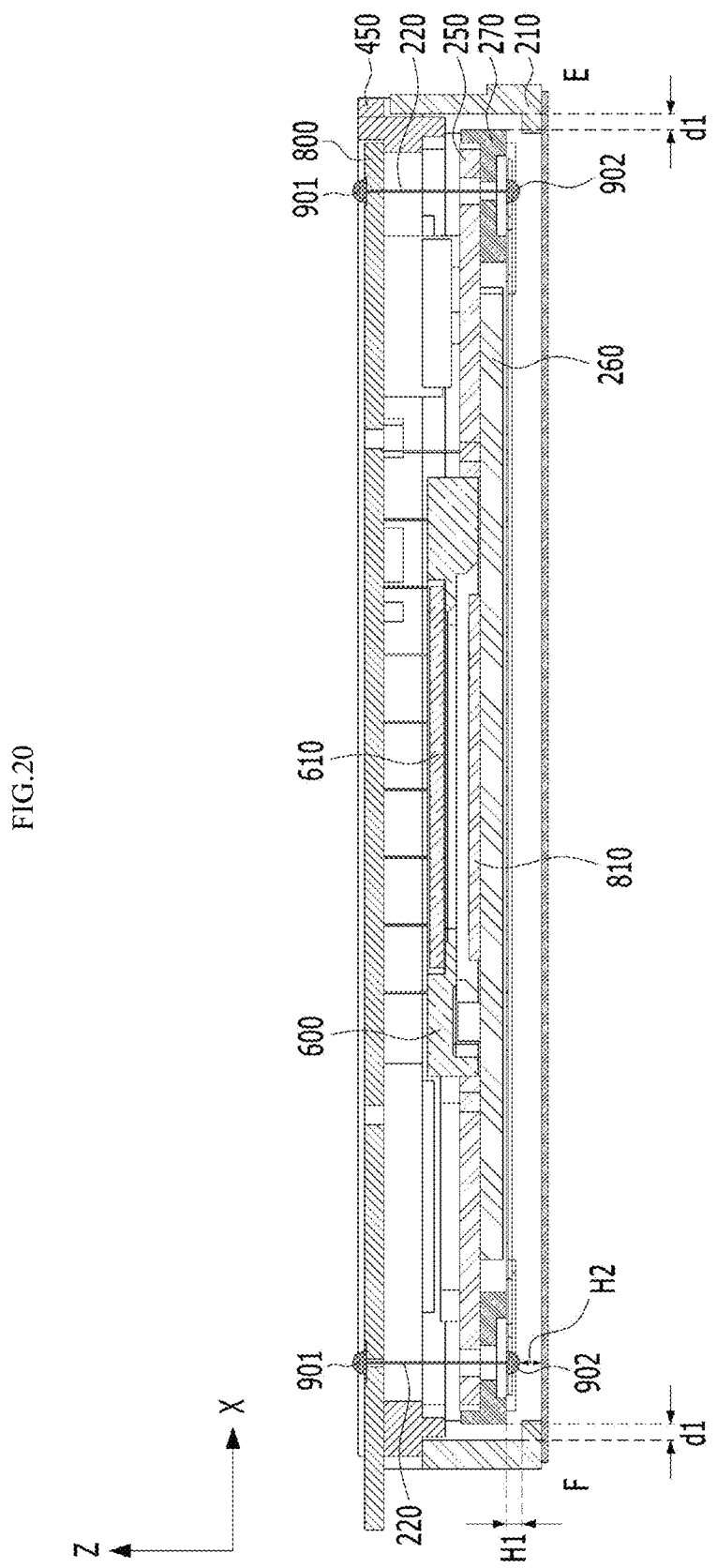
FIG. 20 is a cross-sectional view taken along line E-F of the image sensor unit shown in FIG. 8.
Figure 21:
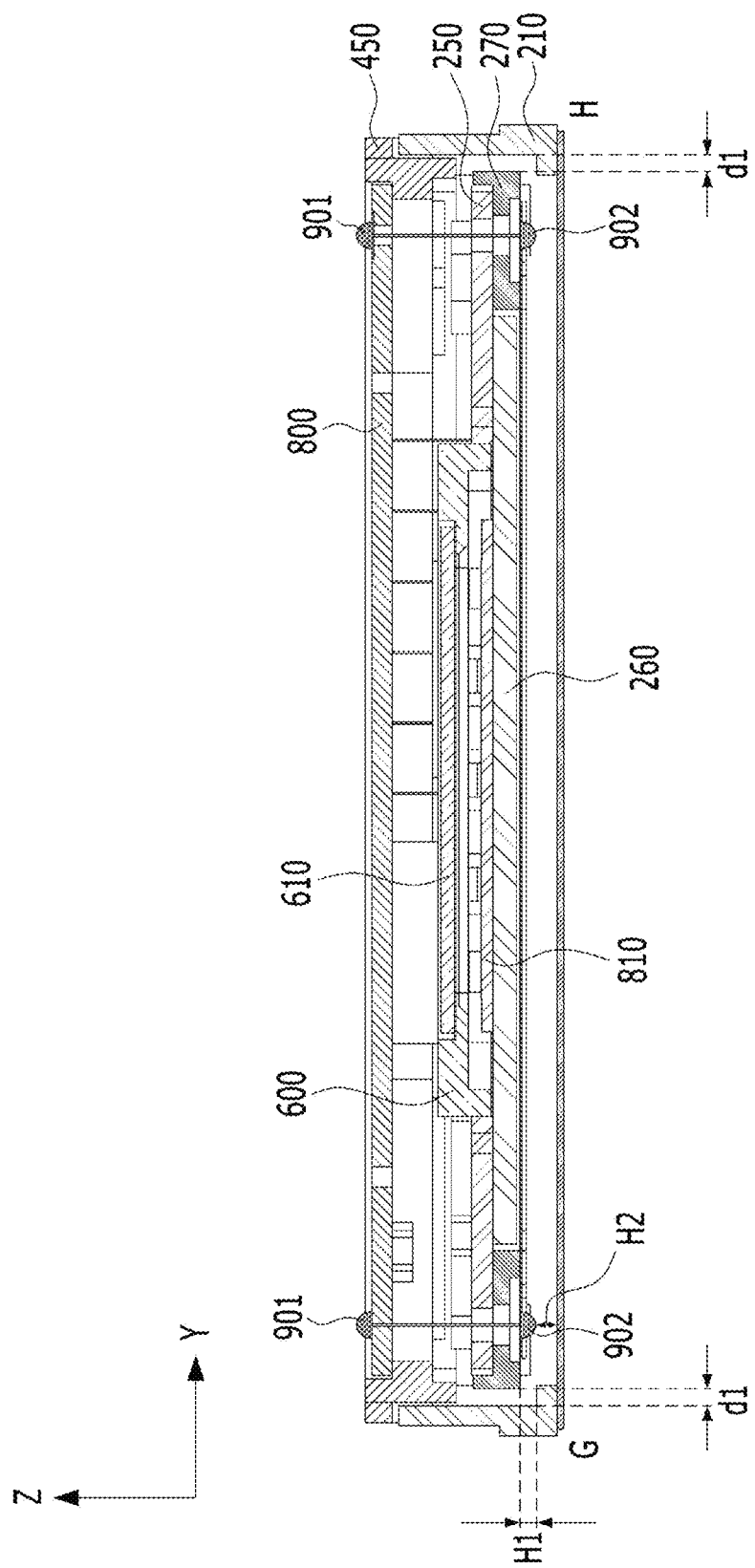
FIG. 21 is cross-sectional view taken along line G-H of the image sensor unit shown in FIG. 8.
Figure 22:
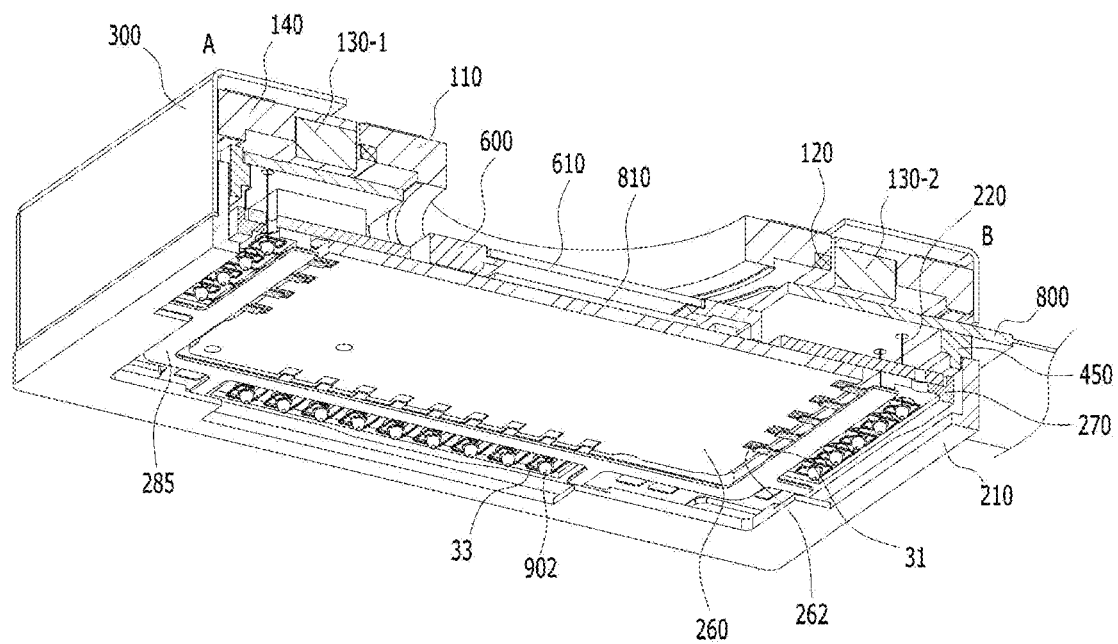
FIG. 22 is a perspective view of the camera module from which the bottom cover is removed, partially shown in cross-section.

FIG. 8 is a plan view of the image sensor unit 350. FIG. 9 is an exploded perspective view of the image sensor unit 350. FIG. 10 is a perspective view of the second circuit board 800 and the housing 450 shown in FIG. 9. FIG. 11 is a perspective view of the first circuit board 800, the housing 450, and the magnet 23 shown in FIG. 9. FIG. 12 is an exploded perspective view of a second circuit board 250, a second coil 230, and a holder 270. FIG. 13 is an exploded perspective view of the second circuit board 250, the image sensor 810, the connecting board 260, the support member, the holder 270, and the connective elastic member 280, which are shown in FIG. 9. FIG. 14 is a bottom view of the image sensor unit 350 shown in FIG. 8 from which a bottom cover 219 is removed. FIG. 15 is a fragmentary enlarged view of the connective elastic member 280. FIG. 16 is a bottom view of a single connecting spring 281. FIG. 17 is a view illustrating connecting springs 1A, 2A, 3A, and 4A of the connective elastic member 280. FIG. 18 is a cross-sectional view taken along line A-B of the camera module 10 shown in FIG. 1. FIG. 19 is a cross-sectional view taken along line C-D of the camera module 10 shown in FIG. 1. FIG. 20 is a cross-sectional view taken along line E-F of the image sensor unit 350 shown in FIG. 8. FIG. 21 is cross-sectional view taken along line G-H of the image sensor unit 350 shown in FIG. 8. FIG. 22 is a perspective view of the camera module 10 from which the bottom cover 219 is removed, partially shown in cross-section.

Referring to FIGS. 8 to 22, the image sensor unit 350 may include the first circuit board 800, the magnet 23, the second circuit board 250, the second coil 230, the connecting board 260, the image sensor 810, the connective elastic member 280, and the support member 220.

The image sensor unit 350 may further include the housing 450, configured to receive at least a portion of the first circuit board 800.

The first circuit board 800 may serve to supply a signal to the image sensor unit 350 from the outside, or to output a signal to the outside from the image sensor unit 350.

Referring to FIGS. 9 and 10, the first circuit board 800 may include a first region 801 corresponding to the AF operation unit 100, a second region 802 at which a connector 840 is disposed, and a third region 803 connecting the first region 801 to the second region 802. The connector 840 may be conductively connected to the second region 802 of the second circuit board 800, and may include a port configured to be conductively connected to an external device.

Although each of the first region 801 and the second region 802 of the first circuit board 800 may include a flexible substrate and a rigid substrate and the third region 803 may include a flexible substrate, the disclosure is not limited thereto. In another embodiment, at least one of the first to third regions 801 to 803 of the second circuit board 800 may include at least one of a rigid substrate and a flexible substrate.

The first circuit board 800 may have a bore 800A corresponding to the bore in the bobbin 110, the lens module 400 and/or the image sensor 810. For example, the bore 800A in the second circuit board 800 may be formed in the first region 801.

Referring to FIG. 18, at least a portion of the lens module 400 may extend through the bore 800A in the second circuit board 800, and may be positioned under a second surface 44B of the second circuit board 800.

The lens module 400 may be position on the second circuit board 250. For example, the lens module 400 may be positioned above the bore 501 in the second circuit board 250.

For example, the lower portion, the lower end, or the lower surface of the lens or the lens barrel of the lens module 400 may extend through the bore 800A in the second circuit board 800, and may be positioned under the second surface 44B of the first circuit board 800.

For example, the lower portion, the lower end, or the lower surface of the lens or the lens barrel of the lens module 400 may be positioned above a first surface 51A (for example, the upper surface) of the first circuit board 250.

Furthermore, the lower portion, the lower end, or the lower surface of the lens or the lens barrel of the lens module 400 may be positioned above the bore 501 in the second circuit board 250.

Although the first circuit board 800 may be configured to have a polygonal shape (for example, a quadrangular shape, a rectangular shape, or a square shape) when viewed from above, the disclosure is not limited thereto. In another embodiment, the second circuit board 800 may be configured to have another shape, such as a circular shape. Furthermore, although the bore 800A in the first circuit board 800 may be configured to have a polygonal shape (for example, a quadrangular shape, a square shape, or a rectangular shape), the disclosure is not limited thereto. In another embodiment, the bore 800A may be configured to have another shape, such as a circular shape.

The first circuit board 800 may include a plurality of pads 800B. Here, the pad 800B may be alternatively referred to as a "lead pattern", a "lead member" or a "hole".

Each of the plurality of pads 800B may have a hole formed through the first circuit board 800 in the optical-axis direction. Furthermore, each of the plurality of pads 800B may be formed so as to surround the hole, and may further include a lead pattern or a conductive layer.

The support member 220 may be soldered to the pad 800B in the state of extending through the hole in the pad 800B, and may be conductively connected to the lead pattern disposed around the hole in the pad 800B.

For example, the plurality of pads 800B may be spaced apart from each other at a predetermined interval so as to surround the bore 800A in the first circuit board 800. For example, the plurality of pads 800B may be disposed between the bore 800A in the first circuit board 800 and the sides of the first circuit board 800.

The first circuit board 800 may have at least one coupling hole 800C configured to be coupled to a coupling protrusion 45B of the housing 450. Although the coupling hole 800C may be a through hole formed through the first circuit board 800, the disclosure is not limited thereto. In another embodiment, the coupling hole 800C may be a groove.

For example, although the coupling hole 800C may be embodied as a plurality of coupling holes, which are formed in corners of the first circuit board 800 that are opposite each other in a diagonal direction, the disclosure is not limited thereto. The coupling holes may be positioned near sides of the second circuit board 800 or between the sides of the second circuit board 800 and the bore 800A.

The first circuit board 800 may include a plurality of terminals 80A.

The plurality of terminals 80A may be formed on the first surface (for example, the upper surface) 44A of the first circuit board 800. For example, the plurality of terminals 80A may be disposed at one side of the first circuit board 800 adjacent to one corner of the first circuit board 800, and may be conductively connected to the terminals B1 to B6 of the circuit board 190.

For example, the first circuit board 800 may include a terminal member 85 at which the plurality of terminals 80A are formed. The terminal member 85 may project from one side of the second circuit board 800 in a direction perpendicular to the optical axis.

The image sensor unit 350 may further include the housing 450 in which the first circuit board 800 is disposed, seated or received.

The housing 450 may receive therein at least a portion (for example, the first region 801). The housing 450 may be alternatively referred to as a "magnet holder".

The housing 450 may be disposed below the housing 140 of the AF operation unit 100, and may be coupled to the housing 140 of the image sensor unit 350. For example, the upper portion, the upper end, or the upper surface of the housing 450 may also be coupled to the lower portion, the lower end, or the lower surface of the housing 140 of the AF operation unit 100 via an adhesive member or a coupling structure.

Here, the coupling structure may include a first coupling portion provided at the lower portion, the lower end or the lower surface of the housing 140 of the AF operation unit 100, and a second coupling portion, provided at the upper portion, the upper end, or the upper surface of the housing 450 of the image sensor unit 350. The first coupling portion may be a protrusion or a groove (or hole), and the second coupling portion may be a groove (or hole) or a protrusion.

The housing 450 may be disposed under the first circuit board 800. For example, the AF operation unit 100 may be disposed above the first circuit board 800, and the housing 450 may be disposed under the first circuit board 800.

The housing 450 may have a shape that corresponds to or coincides with the first region 801 of the first circuit board 800. Although the housing 450 may be configured to have a polygonal shape (for example, a quadrangular shape, a square shape, or a rectangular shape) when viewed from above, the disclosure is not limited thereto. In another embodiment, the housing 450 may be configured to have a circular shape or an elliptical shape.

The housing 450 may have formed therein a bore 450A. At least a portion of the bore 450A in the housing 450 may correspond to or overlap the bore 800A in the first circuit board 800.

Although the bore 450A in the housing 450 may be configured to have a polygonal shape (for example, a quadrangular shape or an octagonal shape), a circular shape or a crisscross shape when viewed from above, the disclosure is not limited thereto. The bore 450A in the housing 450 may be a through hole formed through the housing 450 in the optical-axis direction.

For example, the housing 450 may include a body 42 configured to support at least a portion (for example, the first region 801) of the first circuit board 800, a projection 43 projecting from the body 42 in the direction of the optical axis OA, and a bore 450A formed in the body 420.

The housing 450 may include at least one coupling protrusion 45B, which projects from the upper surface of the body 42 thereof. For example, the coupling protrusion 45B may project from the upper surface of the housing 450 in a direction toward the first surface (for example, the lower surface) 44B of the second circuit board 800 from the upper surface of the body 42.

The housing 450 may include escape regions 41 corresponding to the plurality of pads 800B. The escape regions 41 may be formed at positions corresponding to the support members 220 so as to avoid spatial interference between the housing 450 and the support members 220.

The projection 43 of the housing 450 may have a first opening 46, through which a portion of the first region 801 of the first circuit board 800 is exposed to the outside, and a second opening 47, through which the terminals 80A formed at the terminal member 85 are exposed to the outside.

For example, the second opening 47 in the housing 450 may be formed at a position that corresponds to the opening 141 in the housing 140 of the AF operation unit 100 in the direction of the optical axis OA.

Referring to FIGS. 1 to 10, the first circuit board 800 may include the terminals 80A corresponding to the terminals B1 to B6 of the circuit board 190 of the AF operation unit 100.

Each of the terminals 80A of the first circuit board 800 may be coupled to a corresponding one of the terminals B1 to B6 of the circuit board 180 of the AF operation unit 100 via solder or a conductive member.

Each of the terminals 80A of the first circuit board 800 may be conductively connected to a corresponding one of the terminals B1 to B6 of the circuit board 190 of the AF operation unit 100. Drive signals or power may be supplied to the first position sensor 170 through the first circuit board 800, and the output of the first position sensor 170 may be output to the first circuit board 800. Furthermore, drive signals or power may be supplied to the first coil 120 through the first circuit board 800.

Referring to FIG. 11, the first circuit board 800 may include the connector 840 disposed in the second region 802. For example, the connector 840 may be disposed on one surface (for example, the lower surface or the upper surface) of the second region 802 of the first circuit board 800.

The housing 450 may include a seating portion 8A, in which the magnet 23 is received, disposed or seated. The seating portion 8A may be formed in the body 42 of the housing 450.

For example, the seating portion 8A may be formed in a corner of the housing 450. For example, the seating portion 8A may be a groove depressed from the lower surface of the housing 450, and may have a shape corresponding to the shape of the magnet 23. For example, although the housing 450 may include four seating portions 8A, which are respectively formed in the four corners thereof, the disclosure is not limited thereto. In another embodiment, the housing 450 may include a number of seating portions corresponding to the number of magnets 23.

The magnet 23 may be disposed at the housing 450. For example, although the magnet 23 may be disposed at a corner of the housing 140, the disclosure is not limited thereto. In another embodiment, the magnet 23 may be disposed at a side portion of the housing 450.

The magnet 23 may serve to provide a magnetic field, which interacts with the second coil 230 in order to perform OIS (Optical Image Stabilization) for the purpose of handshake correction.

For example, the magnet 23 may include a plurality of magnets 23A to 23D. Each of the magnets 23A to 23D may be disposed at a corresponding one of the corners of the housing 450.

Although each of the magnets 23A to 23D may be a monopolar magnetized magnet having one N pole and one S pole, the disclosure is not limited thereto. In another embodiment, each of the magnets 23A to 23D may be a bipolar magnetized magnet, which has two N poles and two S poles, or a tetrapolar magnetized magnet.

For example, each of the four magnets 23A to 23D may be disposed at a corresponding one of the four corners of the housing 450. For example, although two magnets (for example, 23A and 23B), which are disposed at two adjacent corners of the housing 450, may be oriented so as to be perpendicular to each other and two magnets (for example, 23A and 23C; 23B and 23D), which are disposed at two corners of the housing 450 which face each other in a diagonal direction, may be oriented so as to be parallel to each other, the disclosure is not limited thereto.

For example, the inner portions of the magnets 23A to 23D may have the same polarity. Furthermore, the outer portions of the magnets 23A to 23D may have the same polarity.

For example, the inner portion of each of the magnets 23A to 23D may be magnetized into an N pole, and the outer portion of each of the magnets 23A to 23D may be magnetized into an S pole. In a modification, the inner portion of each of the magnets 23A to 23D may be magnetized into an S pole, and the outer portion of each of the magnets 23A to 23D may be magnetized into an N pole.

Referring to FIGS. 9 to 13, the second circuit board 250 may be disposed under the first circuit board 800.

The second circuit board 250 may have therein the bore 501, which corresponds to the bore in the bobbin 110, the bore in the housing 450, and/or the bore 800A in the first circuit board 800.

For example, the bore 501 in the second circuit board 250 may be a through hole, which is formed through the second circuit board 250 in the optical-axis direction, and may be positioned in the center of the second circuit board 250.

When viewed from above, although the shape of the second circuit board 250, for example, the circumferential shape thereof, may have a shape that coincides with or corresponds to the upper surface of the base 210, for example, a rectangular shape, the present disclosure is not limited thereto.

When viewed from above, although the shape of the bore 501 in the second circuit board 250 may be a polygonal shape, for example, a rectangular shape, a circular shape, or an elliptical shape, the present disclosure is not limited thereto.

The second circuit board 250 may have a plurality of holes 250A corresponding to the plurality of pads 800B of the first circuit board 800. Although the plurality of holes 250A in the second circuit board 250 may be through holes, which are formed through the second circuit board 250 in the direction of the optical axis OA, the present disclosure is not limited thereto. In another embodiment, the plurality of holes 250A may be escape grooves or escape portions configured to avoid spatial interference with the support members 220.

For example, the plurality of holes 250A in the second circuit board 250 may be spaced apart from each other at regular intervals so as to surround the bore 501 in the second circuit board 250. For example, the plurality of holes 250A may be positioned in the region between the bore 501 in the second circuit board 250 and the sides of the second circuit board 250.

The second circuit board 250 may have at least one coupling hole 25A, which is to be coupled to a protrusion 273 of the holder 270. Although the coupling hole 25A in the second circuit board 250 may be a through hole formed through the second circuit board 250, the present disclosure is not limited thereto. In another embodiment, the coupling hole 25A may be a groove.

For example, although the coupling hole 25A may be formed in at least one of the corners of the second circuit board 250, the present disclosure is not limited thereto. Alternatively, the coupling hole 25A may be positioned adjacent to a side of the second circuit board 250 or between a side of the second circuit board 250 and the bore 501.

Referring to FIG. 13, the second circuit board 250 may include a plurality of terminals 251. For example, the plurality of terminals 251 may be disposed on a second surface 51B (for example, the lower surface) of the second circuit board 250 so as to be spaced apart from each other. The second surface 51B may be the surface opposite the first surface 51A. The number of terminals 251 is not limited to what is illustrated in FIG. 13, and may be larger or smaller than the number illustrated in FIG. 13.

For example, the plurality of terminals 251 may be positioned between the bore 501 in the second circuit board 250 and the one side of the second circuit board 250. For example, the plurality of terminals 251 may be positioned closer to the bore 501 in the second circuit board 250 than to the plurality of holes 250A.

The second circuit board 250 may include pads 9A to 9H, configured to be conductively connected to the second coil 230. Here, the pads may be alternatively referred to as "terminals" or "bonding portions". The pads 9A to 9H of the second circuit board 250 may be conductively connected to the plurality of terminals 251 of the second circuit board 250.

The second circuit board 250 may be a printed circuit board (PCB) or a flexible printed circuit board (FPCB).

The second coil 230 may be disposed or mounted on the first surface (for example, the upper surface) of the second circuit board 250.

The second coil 230 may be disposed under the housing 450. The second coil 230 may be disposed under the magnet 23.

For example, the second coil 230 may be disposed on the circuit board 250 so as to correspond to, face, or overlap the magnet 23 disposed at the housing 450 in the direction of the optical axis OA.

For example, the second coil 230 may include the plurality of coil units 230-1 to 230-4. For example, the second coil 230 may include four coil units.

Each of the plurality of coil units 230-1 to 230-4 may face or overlap a corresponding one of the magnets 23A to 23D disposed at the housing 450 in the direction of the optical axis (OA).

Although each of the coil units 230-1 to 230-4 may be configured to have the form of a coil block having a closed curve shape or a ring shape, the disclosure is not limited thereto. For example, each of the coil units 230-1 to 230-4 may be composed of an FP (fine pattern) coil. In another embodiment, the coil units 230-1 to 230-4 may be formed at an additional circuit member other than the first circuit board 250. In another embodiment, the coil units may be directly formed at the circuit board 250.

For example, the four coil units 230-1 to 230-4 may be disposed or formed at the corners or the corner regions of the rectangular circuit board 250.

The second coil 230 may be conductively connected to the second circuit board 250 such that power or drive signals are supplied to the second coil 230 through the second circuit board 250. The power or drive signal supplied to the second coil 230 may be a DC signal, an AC signal or a signal containing both DC and AC components, and may be of a voltage type or a current type.

Here, current may be independently applied to at least three coil units, among the four coil units.

In a first embodiment, the second coil 230 may be controlled through three channels.

For example, only the first to third coil units among the first to fourth coil units may be conductively isolated from each other, and the fourth coil unit may be conductively connected to one of the first to third coil units in series. Here, three pairs of lead wires, that is, a total of six lead wires, may be taken from the second coil 230.

In a second embodiment, the second coil 230 may be controlled through four individual channels. Here, the four coil units may be conductively isolated from each other. One of forward current and reverse current may be selectively applied to each of the coil units. Here, four pair of lead wires, that is, a total of eighth lead wires may be taken from the second coil 230.

Although the operation of rotation about the z axis is performed by the second coil 230 and a pair of magnets 23 in the first embodiment, the rotational operation about the z axis is performed by the second coil 230 and two pairs of magnets 23 in the second embodiment.

For example, two coil units 230-1 and 230-3, which face each other in a diagonal direction, may extend or be oriented in a first axial direction (for example, in the x-axis direction), and two other coil units 230-2 and 230-4, which face each other in a diagonal direction, may extend or be oriented in a second axial direction (for example, in the y-axis direction). Here, the first axial direction may be perpendicular to the second axial direction.

The long side of the first coil 916-1 and the long side of the third coil 916-3 may be disposed parallel to each other. The long side of the second coil 916-2 and the long side of the fourth coil 916-4 may be disposed parallel to each other. The long side of the first coil 916-1 and the long side of the second coil 916-2 may not be disposed parallel to each other. Here, the long side of the first coil 916-1 and the long side of the second coil 916-2 may be disposed such that the imaginary lines extending therefrom intersect each other. The direction in which the first coil 916-1 is oriented and the direction in which the second coil 916-2 is oriented may be perpendicular to each other.

Although the second coil 230 may include, for example, two coil units 230-1 and 230-3 for the second direction (for example, the x-axis direction) and two coil units 230-2 and 230-4 for the third direction (for example, the y-axis direction), the present disclosure is not limited thereto.

For example, the coil units 230-1 and 230-3 for the second direction may be disposed at two corners of the circuit board 250, which are opposite each other in a first diagonal direction of the circuit board 250, and the coil units 230-2 and 230-4 for the third direction may be disposed at the other two corners of the circuit board 250, which are opposite each other in a second diagonal direction of the circuit board 250. The first diagonal direction and the second diagonal direction may be perpendicular to each other.

In another embodiment, the second coil 230 may include only one coil unit for the second direction and one coil unit for the third direction, or may include four or more coil units.

For example, the coil units 230-1 and 230-2 for the second direction may interact with the magnets 23A and 23C, which correspond to respective ones of the coil units 230-1 and 230-3 in the direction of the optical axis OA, to provide the electromagnetic force resulting from the interaction in first axial direction (for example, the x-axis direction).

Furthermore, the coil units 230-2 and 230-4 for the third direction may interact with the magnets 23B and 23D, which correspond to respective ones of the coil units 230-2 and 230-4 in the direction of the optical axis OA, to provide the electromagnetic force resulting from the interaction in the second axial direction (for example, the y-axis direction).

For example, the four coil units may be driven separately from the rest.

For example, one end of the first coil unit 230-1 may be connected to the first pad 9A, and the other end of the first coil unit 230-1 may be connected to the second pad 9B. The first and second pads 9A and 9B may be provided with a first drive signal for activating the first coil unit 230-1.

One end of the third coil unit 230-3 may be connected to the third pad 9C, and the other end of the third coil unit 230-3 may be connected to the further pad 9D. The third and fourth pads 9C and 9D may be provided with a second drive signal for activating the third coil unit 230-3.

One end of the second coil unit 230-2 may be connected to the fifth pad 9E, and the other end of the second coil unit 230-2 may be connected to the sixth pad 9F. The fifth and sixth pads 9E and 9F may be provided with a third drive signal for activating the second coil unit 230-2.

One end of the fourth coil unit 230-4 may be connected to the seventh pad 9G, and the other end of the fourth coil unit 230-4 may be connected to the eighth pad 9H. The seventh and eighth pads 9G and 9H may be provided with a fourth drive signal for activating the fourth coil unit 230-4.

In another embodiment, the coil units 230-1 and 230-2 for the second direction may be connected to each other in series, and the coil units 230-2 and 230-4 for the third direction may be connected to each other in series. The second circuit board 250 may include two pads connected to two pair of ends of the two coil units 230-1 and 230-3 for the second direction, which are connected to each other in series, and two pads connected to two pair of ends of the other two coil units 230-2 and 230-4 for the third direction, which are connected to each other in series. The first drive signal may be provided to the two pads, and the second drive signal may be provided to the other two pads.

The OIS movable unit including the image sensor 810 may be moved in the second and/or third direction, for example, in the x-axis direction and/or in the y-axis direction, by the interaction between the magnets 23A to 23D and the coil units 230-1 to 230-4, with drive signals being applied thereto, thereby performing handshake correction. A description of the OIS movable unit will be given later.

The image sensor unit 350 may further include a second position sensor 240 for feedback OIS operation.

The second position sensor 240 may be disposed, coupled or mounted to the first surface (for example, the upper surface) 51A of the second circuit board 250. The second position sensor 240 may detect displacement of the OIS movable unit in a direction perpendicular to the optical axis OA, for example, shifting or tilting of the OIS movable unit in a direction perpendicular to the optical axis, or rotation of the OIS movable unit about the optical axis.

Here, the first position sensor 170 may be alternatively referred to as an "AF position sensor", and the second position sensor 240 may be alternatively referred to as an "OIS position sensor".

The second position sensor 240 may include one or more sensors 240a, 240b and 240c.

For example, the second position sensor 230 may include three sensors 240a, 240b and 240c.

Each of the first to third sensors 240a, 240b and 240c may be a Hall sensor. In another embodiment, each of the first to third sensors 240a, 240b and 240c may be embodied as a driver IC including a Hall sensor.

Each of the first to third sensors 240a, 240b and 240c may be conductively connected to predetermined corresponding terminals, among the terminals 251 of the second circuit board 250. For example, respective drive signals may be applied to the first to third sensors 240a, 240b and 240c via the terminals 251, and the output signal of each of the first to third sensors may be output to other predetermined terminals, among the terminals 251.

For example, because four coil units 230-1 to 23-4 are controlled through three channels, each of the first to third sensors 240a, 240b and 240c may be disposed in a corresponding one of the three coil units 230-1 to 230-3, and the remaining coil unit 230-4 may not be provided with a sensor.

All of movement of the image sensor 810 in the x-axis and y-axis directions and rotation of the image sensor 810 about the z-axis may be detected by the three sensors 240a, 240b and 240c.

One of the three sensors may detect a movement amount and/or displacement of the OIS movable unit in the x-axis direction, and another one of the three sensors may detect a movement amount and/or displacement of the OIS movable unit in the y-axis direction. The remaining one of the three sensors may detect a movement amount and/or displacement of the OIS movable unit in the x-axis direction and/or in the y-axis direction. It is possible to detect rotational movement of the OIS movable unit about the z-axis using the outputs of two or more of the three sensors 240a, 240b and 240c.

In the embodiment shown in FIG. 12, the second position sensor 240 may include three sensors 240a, 240b and 240c.

For example, the first sensor 240a may be disposed on the first surface (for example, the upper surface) 51A of the circuit board 250 in the first coil unit 230-1, and the third sensor 240c may be disposed on the first surface (for example, the upper surface) 51A of the circuit board 250 in the third coil unit 230-3. The second sensor 240b may be disposed on the upper surface of the circuit board 250 in the second coil unit 230-2.

For example, although the first sensor 240a may not overlap the first coil unit 230-1 in the direction of the optical axis OA, the third sensor 240c may not overlap the third coil unit 230-3 in the direction of the optical axis OA, and the second sensor 240b may not overlap the second coil unit 230-2 in the direction of the optical axis OA, the disclosure is not limited thereto. In another embodiment, at least a portion of each of the first to third sensors may overlap a corresponding one of the first to third coil units in the optical-axis direction.

Although the first sensor 240a may overlap the magnet 24A, the third sensor 240c may overlap the magnet 24C, and the second sensor 240b may overlap the magnet 24B in the optical-axis direction, the present disclosure is not limited thereto. In another embodiment, the first to third sensors 240a, 240b and 240c may not overlap respective ones of the magnets 24A, 24B and 24C.

In another embodiment, the second position sensor 240 may include one first sensor and one second sensor.

The image sensor unit 350 may include at least one of a motion sensor 820, a controller 830, a memory 512, and capacitors 514.

The motion sensor 820, the controller 830, the memory 512, and the capacitors 514 may be disposed or mounted to the first circuit board 800 or the second circuit board 250.

For example, the motion sensor 820 and the memory 512 may be disposed on the second circuit board 250.

In another embodiment, for example, the motion sensor 820 and the memory 512 may be disposed on the lower surface 44B (of, for example, the first region 801) of the first circuit board 800.

The motion sensor 820 may output information about a rotational angular speed caused by motion of the camera module 10. The motion sensor 820 may be embodied as a dual-axis or triple-axis gyro sensor or an angular speed sensor.

The memory 512 may store first code values according to displacement of the bobbin 110 in the optical-axis direction for AF feedback operation. Furthermore, the memory 512 may store second code values according to displacement of the OIS movable unit in a direction perpendicular to the optical-axis direction for OIS feedback operation. In addition, the memory 512 may store an algorithm or a program for operation of the controller 830.

For example, the memory 512 may be, for example, an EEPROM (Electrically Erasable Programmable Read-Only Memory).

The controller 830 may be conductively connected to the first position sensor 170 and the second position sensor 240.

The controller 830 may control the output signal of the first position sensor 170 and drive signals, which are supplied to the first coil 120 using first code values stored in the memory 512, thereby performing a feedback autofocusing operation.

Furthermore, the controller 830 may control the output signal, supplied from the second position sensor 240, and drive signals, which are supplied to the second coil 230 using second code values stored in the memory 512, thereby performing a feedback OIS operation.

Although the controller 830 may be of a driver IC type, the disclosure is not limited thereto. For example, the controller 830 may be conductively connected to the terminal 251 of the second circuit board 250.

The connecting board 260 may be disposed below the second circuit board 250.

When viewed from above, although the connecting board 260 may have a polygonal shape (for example, a quadrilateral shape, a square shape, or a rectangular shape), the present disclosure is not limited thereto. In another embodiment, the connecting board may have a circular shape or an elliptical shape.

For example, the area of the front surface of the connecting board 260 having a quadrilateral shape may be larger than the area of the bore 501 in the second circuit board 250. For example, the underside of the bore 501 in the second circuit board 250 may be blocked or closed by the connecting board 250.

When viewed from above, for example, the outer surfaces (or the sides) of the connecting board 260 may be positioned between the outer surfaces (or sides) of the second circuit board 250 and the bore 501 in the second circuit board 250.

The connecting board 260 may include a seating region 260A in which the image sensor 810 is disposed. For example, a first surface (for example, the upper surface) 60A of the connecting board 260 may be provided with the seating region 260A to which the image sensor 810 is disposed or coupled. For example, the seating region 260A may be positioned so as to correspond to the bore 501 in the second circuit board 250.

Referring to FIG. 12, the connecting board 260 may include a first terminal 261, which is conductively connected to the terminal 251 of the second circuit board 250. The first terminal 261 may be alternatively referred to as a "first terminal" or a "first terminal unit". For example, the first terminal 261 may include a plurality of first terminals.

For example, the first terminal 261 of the connecting board 260 may be coupled to the terminal 251 of the second circuit board 250.

For example, the first terminal 261 of the connecting board 260 may be disposed on the first surface (for example, the upper surface) 60A of the connecting board 260, and may correspond to, face, or overlap the terminal 251 of the second circuit board 250 in the optical-axis direction.

Referring to FIG. 13, the connecting board 260 may include a second terminal 262, which is conductively connected to the connective elastic member 280. The second terminal 262 may be alternatively referred to as a "second terminal" or a "second terminal unit".

For example, the second terminal 262 of the connecting board 260 may be coupled to the connective elastic member 270 via solder 38 (see FIG. 14) or a conductive adhesive member. For example, the second terminal 262 may include a plurality of second terminals.

For example, the second terminals 262 of the connecting board 260 may be disposed on the second surface (for example, the lower surface) 60B of the connecting surface 260, and may correspond to, face, or overlap respective ones of the connecting springs 281 of the connective elastic member 270 in the optical-axis direction. The second surface 60B may be the surface opposite the first surface 60A.

Although the connecting board 260 may be a printed circuit board or an FPCB, the present disclosure is not limited thereto.

The first circuit board 800 may be alternatively referred to as a "first circuit board part" or a "first board part". The second circuit board 250 and the third circuit board 260 may constitute a "second circuit board part" or a "second board part".

The holder 270 may be disposed below the second circuit board 250 so as to support the second circuit board 250. For example, the second surface 51B of the second circuit board 250 may be in contact with the upper surface of the holder 270.

For example, the holder 270 may be disposed between the second circuit board 250 and the connective elastic member 270.

The holder 270 may include a projection 276, which projects from the upper surface of the holder 270 in the direction of the second circuit board 250. The projection 276 may support the side surface of the second circuit board 250, or may serve as a guide configured to allow the second circuit board 250 to be easily disposed or seated on the holder 270. The projection 276 may be alternatively referred to as a "guide portion" or a "guide protrusion".

The projection 276 may be in contact with the outer surface of the second circuit board 250 when the second circuit board 250 is seated on the holder 270. For example, the projection 276 may include a plurality of (for example, four) projections, and all of the plurality of projections 276 may be in contact with the four outer surfaces of the second circuit board 250.

For example, although the projections 276 may be formed on outer surfaces that face each other, the present disclosure is not limited thereto.

When viewed from above or underneath, although the outer surface of the holder 270 may have a quadrilateral shape, for example, a square shape or a rectangular shape, the present disclosure is not limited thereto. In another embodiment, the outer surface of the holder 270 may have a circular shape or an elliptical shape.

The holder 270 may include the protrusion 273, which corresponds to or faces the coupling hole 25A in the second circuit board 250. The protrusion 273 of the holder 270 may project from a first surface 70A of the holder 270, and may be coupled to the coupling hole 25A in the second circuit board 250. The holder 270 and the second circuit board 250 may be coupled to each other. The first surface 70A of the holder 270 may be the surface that faces the second surface 60B of the second circuit board 250.

The holder 270 may have therein a bore 71 corresponding to the connecting board 260.

Although the bore 71 in the holder 270 may have a quadrilateral shape, for example, a square shape or a rectangular shape, the present disclosure is not limited thereto. In another embodiment, the bore 71 may have a circular shape or an elliptical shape.

For example, although the bore 71 in the holder 270 may have a shape that coincides with or is identical to the shape of the connecting board 260, the present disclosure is not limited thereto.

The size or area of the bore 71 in the holder 270 may be larger than the area of the first surface 60A or the second surface 60B of the connecting board 260.

The connecting board 260 may be disposed in the bore 71 in the holder 270.

For example, the holder 270 may have a shape surrounding the connecting board 260.

The holder 270 may have a plurality of holes 270A corresponding to the plurality of holes 250A in the second circuit board 250. Although the plurality of holes 270A in the holder 270 may be through holes, which are formed through the holder 270 in the direction of the optical axis OA, the present disclosure is not limited thereto. In another embodiment, each of the plurality of holes 270A may have an escape groove or an escape portion for avoiding spatial interference with the support member 220.

For example, the plurality of holes 270A in the holder 270 may be spaced apart from each other at regular intervals so as to surround the bore 71 in the holder 270. For example, the plurality of holes 270A may be positioned between the bore 71 in the holder 270 and the sides of the holder 270.

Referring to FIG. 13, a projection 275 may be formed on the second surface 70B of the holder 270. The projection 275 of the holder 270 may project from the second surface 70B of the holder 270 toward the bottom of the base 210.

The projection 275 of the holder 270 may project further toward the bottom of the base 210 than the connective elastic member 280. Alternatively, the projection 275 of the holder 270 may project further toward the bottom of the base 210 than a solder 902 that couples the connective elastic member 280 to the support member 220.

For example, the first distance between the projection 275 of the holder 270 and the bottom of the base 210 in the optical-axis direction may be less than the second distance between the connective elastic member 280 and the bottom of the base 210. For example, the first distance may be less than the third distance between the solder 902 and the bottom of the base 210.

The projection may serve as a stopper configured to inhibit the second surface 70B of the holder 270, the connective elastic member 280, and/or the solder 902 from directly colliding with the bottom of the base 210 due to external impact.

For example, although the projection 275 may be disposed at a corner of the second surface 70B of the holder 270, the present disclosure is not limited thereto. In another embodiment, the projection 275 may be disposed between the side of the second surface 70B of the holder 270 and the bore 71 in the holder 270.

Referring to FIG. 15, the holder 270 may have a groove 272 formed in the second surface 70B so as to be depressed. The groove 272 may include a bottom 272a, having a height difference with respect to the second surface 70B in the direction of the optical axis OA, and a side wall 272b, connecting the bottom 272a to the second surface 70B.

The bottom 272a of the groove 272 may be positioned so as to be closer to the first surface 70A of the holder 270 than to the second surface 70B of the holder 270.

The plurality of holes 270A in the holder 270 may overlap the groove 272 in the holder 270 in the optical-axis direction. For example, each of the plurality of holes 270A may have an opening which is open at the bottom 272a of the groove 270. The openings of the plurality of holes 270A, which are open at the bottom 272a, may have a height difference with respect to the second surface 70B of the holder 270 in the optical-axis direction.

For example, the plurality of holes 270A may be formed through the bottom 272a of the groove 270.

Here, the groove 272 in the holder 270 is intended to avoid spatial interference between the connective elastic member 280 and the holder 270 to thus allow the connective elastic member 280 to be easily deformed when the connective elastic member 280 is elastically deformed due to OIS operation.

The connective elastic member 280 may be coupled to the holder 270. The connective elastic member 280 may serve to allow the OIS movable unit to be moved and to allow conductive transmission of signals.

For example, the connective elastic member 280 may be disposed under the holder 270.

For example, the connective elastic member 280 may be coupled to the second surface 70B of the holder 270 via an adhesive member.

The connective elastic member 280 may conductively connect the support member 220 to the connecting board 260, and may include an elastic deformation portion, which is elastically deformable. The elastic deformation portion of the connective elastic member 280 may be coupled to the support member 220.

The connective elastic member 280 may include the connecting spring 281, corresponding to the support member 220.

For example, the connective elastic member 280 may include a plurality of connecting springs 281. The plurality of connecting springs 281 may be disposed so as to be conductively isolated or spaced apart from each other.

The connecting spring 281 may be made of a conductive material, for example, metal such as copper or a copper alloy.

For example, the connecting spring 281 may be made of at least one selected from among gold (Au), silver (Ag), platinum (Pt), titanium (Ti), tin (Sn), copper (Cu), and zinc (Zn). Furthermore, the connective elastic member 280 may be made of paste or solder paste including at least one selected from among gold (Au), silver (Ag), platinum (Pt), titanium (Ti), tin (Sn), copper (Cu) and zinc (Zn), which have excellent bonding force.

For example, the connecting spring 281 may be made of a metal material having a tensile strength of 1000 MPa or higher. For example, the connecting spring 281 may be made of a binary alloy or a ternary alloy including copper.

Referring to FIGS. 15 to 17, the connecting spring 281 may include a first coupler 31 coupled to the second terminal 262 of the connecting board 260, a second coupler 32 coupled to the support member 220, and a connector 33 connecting the first coupler 31 to the second coupler 32.

The first coupler 31 of the connecting spring 281 may be supported by the holder 270. For example, the first coupler 31 may be disposed on the second surface 70B of the holder 270, and may be supported by the second surface 70B of the holder 270.

For example, the first coupler 31 may include a first portion 31a, which is supported by the holder 270 and is connected to the connector 33, and a second portion 32b, which is connected to the first portion 31a and is coupled to the second terminal 262 of the connecting board 260.

For example, the first portion 31a of the first coupler 31 may overlap the second surface 70B of the holder 270 in the optical-axis direction, and the second portion 31b of the first coupler 31 may not overlap the second surface 70B of the holder 270 in the optical-axis direction. For example, the second portion 31b may project from the inner surface of the holder 270 in a direction toward the second terminal 252 of the connecting board 260.

For example, the second portion 31b of the first coupler 31 may be positioned opposite the portion 19A at which the first coupler 31 meets the connector 33.

The first portion 31a of the first coupler 31 may have a width greater than those of other portions 31b and 33 in order to increase the bonding force with the insulation member 285.

The width W1 of the first portion 31a of the first coupler 31 may be greater than the width W2 of the second portion 31b. In other words, the surface area of the first portion 31a of the first coupler 31 may be larger than the surface area of the second portion 31b. The reason for this is to comparatively increase the width W1 (or the surface area) of the first portion 31 to thereby increase the surface area of the first portion 31a, which is supported by the holder 270, in order to stably support the first portion 31a by the holder 270.

Here, the width W1 and W2 may be the lengths of the first coupler 31 in a direction perpendicular to a direction toward the second terminal 252 of the connecting board 260.

In another embodiment, the width W1 of the first portion 31a may be equal to or less than the width W2 of the second portion 31b.

The second coupler 32 may be coupled to one end (for example, the lower end) of the support member 220 via solder 902 or a conductive adhesive member.

For example, the second coupler 32 may be disposed so as to overlap the hole 270a in the holder 270 in the optical-axis direction.

The second coupler 32 may have a hole 32A through which the support member 220 extends.

The end of the support member 220 that has passed through the hole 32A in the second coupler 32 may be directly coupled to the second coupler 32 via a conductive adhesive member or the solder 902, and the second coupler 32 may be conductively connected to the support member 220.

For example, the second coupler 32 may include the hole 32A and a region around the hole 32A, which serve as regions in which the solder 902 is disposed in order to couple the coupler 32 to the support member 220. Although the second coupler 32 is configured to have a circular shape in FIG. 16, the disclosure is not limited thereto. In another embodiment, the second coupler 32 may be configured to have a polygonal shape (for example, a quadrangular shape) or an elliptical shape.

For example, the diameter K of the second coupler 32 may be less than the width W1 of the first portion 31a of the first coupler 31. In another embodiment, the diameter K of the second coupler 32 may be equal to or greater than the width W1 of the first portion 31a of the first coupler 31.

The connector 33 may connect the first portion 31a of the first coupler 31 to the second coupler 32, and may include at least one linear portion and at least one curved portion.

For example, the curved portion may be configured so as to curvedly extend from the linear portion perpendicular to the optical axis leftwards or rightwards.

For example, although the connector 33 may be configured to have a spiral shape, the disclosure is not limited thereto.

For example, the connector 33 may include a bent portion, which curvedly extends clockwise or counterclockwise. In other words, the connector 33 may be bent in a direction corresponding to the rotation of the image sensor in the z-axis direction. Accordingly, the connector 33 is capable of minimizing damage to the connecting spring 281 when the image sensor is rotated in the z-axis direction, with the result that it is possible to inhibit cracks from being generated in the connecting spring 281 and to inhibit the connecting spring 281 from being separated from the insulation member 285.

For example, the connector 33 may include a first linear portion 33-1 connected to the first coupler 31, a first curved portion 34-1, which curvedly extends in a first lateral direction from the first linear portion 33-1, a second linear portion 33-2 connected to the first curved portion 34-1, a second curved portion 34-2, which curvedly extends in a second lateral direction from the second linear portion 33-2, a third linear portion 33-3 connected to the second curved portion 34-2, a third curved portion 34-3, which curvedly extends in a third lateral direction from the third linear portion 33-3, a fourth linear portion 33-3 connected to the third curved portion 34-3, a fourth curved portion 34-4, which curvedly extends in a fourth lateral direction from the fourth linear portion 33-4, and a fifth linear portion 33-5 connecting the fourth curved portion 34-4 to the second coupler 32. For example, although each of the first to fourth lateral directions may be a leftward direction, the disclosure is not limited thereto. In another embodiment, at least one of the first to fourth lateral directions may be a rightward direction.

At least one of the curved portions 34-1 to 34-5 of the connector 33 may be configured to have a round shape.

The width of each of the first to fifth linear portions 33-1 to 33-5 may be different from the width of each of the first to fourth curved portions 34-1 to 34-4. For example, because stress is concentrated in the curved portions, the width of each of the first to fourth curved portions 34-1 to 34-4 may be greater than the width of each of the first to fifth linear portions 33-1 to 33-5, thereby inhibiting damage to the connector 33 caused by stress applied to the connector 33.

The connecting spring 281 may have different widths at different portions thereof.

The connector 33 may have a width less than that of the first portion 31a in order to exert elastic force.

The width W3 of the connector 33 may be less than any of the width W1 of the first portion 31a of the first coupler 31, the width W2 of the second portion 31b of the first coupler 31, and the diameter K of the second coupler 32. Therefore, the connecting spring 281 is capable of flexibly supporting the OIS movable unit and of allowing the OIS movable unit to be easily moved in a direction perpendicular to the optical axis.

For example, the connector 33 may have a width of 20 μm to 1000 μm.

For example, if the width of the connector 33 is less than 20 μm, the overall rigidity of the connecting spring 281 may be lowered, and thus the reliability of the connecting spring 281 may be lowered. Meanwhile, if the width of the connector 33 is greater than 100 μm, the elastic force of the connecting spring 281 may be lowered, and thus the voltage required to activate the second coil 230, configured to shift the OIS movable unit, may be increased, thereby increasing power consumption.

In another embodiment, the width of the connector 33 may be equal to or greater than the diameter K of the second coupler 32.

The thickness t1 of the first coupler 31, the thickness t2 of the connector 33, and the thickness of the second coupler 32 may be the same. In another embodiment, at least one of the thickness t1 of the first coupler 31, the thickness t2 of the connector 33, and the thickness of the second coupler 32 may be different from the remaining ones thereof. For example, the thickness t2 of the connector 33 may be less than the thickness of the first coupler 31 and the thickness of the second coupler 32.

Referring to FIG. 17, the connective elastic member 280 may include a plurality of connecting springs. The plurality of connecting springs may be sorted into a plurality of groups. For example, the plurality of groups may alternatively be referred to as a "plurality of connectors", a "plurality of elastic portions" or a "plurality of connective elastic members".

For example, the connective elastic member 280 may include four groups 1A to 4A corresponding to the four side portions (the four lateral side surfaces) of the connecting board 260 or the four side portions (or the four lateral side surfaces) of the holder 270.

Each of the plurality of groups 1A to 4A may include a plurality of connecting springs 1-1 to 1-9, 2-1 to 2-9, 3-1 to 3-9, or 4-1 to 4-9.

Furthermore, the terminals 262 of the connecting board 260 may be sorted into a plurality of groups corresponding to the groups 1A to 4A of the connective elastic member 280. Each of the plurality of groups of the connecting board 260 may include a plurality of terminals P1 to P9, S1 to S9, R1 to R9, or Q1 to Q9.

For example, each of the plurality of terminals P1 to P9, S1 to S9, R1 to R9, and Q1 to Q9 of the second board 260 may be coupled to a corresponding one of the plurality of connecting springs 1-1 to 1-9, 2-1 to 2-9, 3-1 to 3-9, and 4-1 to 4-9 via solder.

For example, the numbers of connecting springs included in of the plurality of groups 1A to 4A may be the same.

In another embodiment, the numbers of connecting springs included in two groups, which are positioned opposite each other, may be the same.

In a further embodiment, the numbers of connecting springs included in two adjacent groups of the connective elastic member 280 may be different from each other. In another embodiment, the number of connecting springs included in at least one of the plurality of groups 1A to 4A may be different from the number of connecting springs included in each of the remaining groups.

In order to flexibly support the OIS movable unit in an equilibrium state during the OIS operation, the plurality of groups 1A to 4A of the connective elastic member 280 may be disposed so as to be biradially symmetrical about the center point 403.

In another embodiment, the plurality of groups 1A to 4A of the connective elastic member 280 may be disposed so as to be tetraradially symmetrical about the center point 403.

For example, the holder 270 may include four corners 30A to 30D. The first and third groups 1A and 3A may be disposed opposite each other in a transverse direction, and the second and fourth groups 2A and 4A may be disposed opposite each other in a longitudinal direction. The transverse direction and the longitudinal direction may intersect each other.

The first group 1A may be disposed in the first region of the second surface 70B of the holder 270 between the first corner 30A and the second corner 30B, and the second group 2A may be disposed in the second region of the second surface 70B of the holder 270 between the second corner 30B and the third corner 30C. The third group 3A may be disposed in the third region of the second surface 70B of the holder 270 between the third corner 30C and the fourth corner 30D, and the fourth group 4A may be disposed in the fourth region of the second surface 70B of the holder 270 between the fourth corner 30D and the first corner 30A.

The first corner 30A and the third corner 30C of the holder 270 may be positioned opposite each other in a first diagonal direction, and the second corner 30B and the fourth corner 30D of the holder 270 may be positioned opposite each other in a second diagonal direction. The first diagonal direction and the second diagonal direction may be perpendicular to each other.

The centers of the first and third groups 1A and 3A may be positioned so as to deviate in opposite directions with respect to a first central line 401, and the centers of the second and fourth groups 2A and 4A may be positioned so as to deviate in opposite direction with respect to a second central line 402.

Here, the center of each of the groups may be the spatial center of the overall length of each of the groups in the direction in which the connecting springs included in the group are arranged. The overall length may be the distance between the first connecting spring and the last connecting spring of each of the groups.

For example, the first central line 401 may be a line that extends through the center 403 and is parallel to a direction toward the third region of the holder 270, in which the third group 3A is disposed, from the first region of the holder 270, in which the first group 1A is disposed. Alternatively, the first central line 401 may be a line that extends through the center 403 and is parallel to the first outer surface of the holder 270.

For example, the second central line 402 may be a line that extends through the center 403 and is parallel to a direction toward the fourth region of the holder 270, in which the fourth group is disposed, from the second region of the holder 270, in which the second group is disposed. Alternatively, the second central line 402 may be a line that extends through the center 403 and is perpendicular to the first outer surface of the holder 270.

For example, the center 403 may be the center of the bore 71 in the holder 270 or the spatial center of the connective elastic member.

For example, the number of connecting springs of the first group 1A (or the third group 3A), which is disposed at one side (for example, a right side) of the first central line 401, and the number of connecting springs of the first group 1A (or the third group 3A), which is disposed at the other side (for example, a left side) of the first central line 401, may be different from each other.

For example, the number of connecting springs of the second group 2A (or the fourth group 4A), which is disposed at one side (for example, a right side) of the second central line 402, and the number of connecting springs of the second group 2A (or the fourth group 4A), which is disposed at the other side (for example, a left side) of the second central line 402, may be different from each other.

Referring to FIG. 14, the connective elastic member 280 may further include the insulation member 285. The insulation member 285 may be alternatively referred to as an "insulation layer". For example, the insulation member 285 may include polyimide.

The insulation member 285 may surround at least a portion of the connecting spring 281. For example, the insulation member 285 may surround at least a portion of the first portion 31a of the connecting spring 281. For example, the insulation member 285 may cover the lower surface of the first portion 31a of the connecting spring 281.

An adhesive member may be interposed or disposed between the insulation member 285 and the connecting spring 281 and between the insulation member 285 and dummy members 28-1 to 28-4 so as to attach the same to each other.

For example, the second portion 31b of the first coupler 31 of the connecting spring 281, the second coupler 32, and the connector 33 may be exposed from the insulation member 285.

The insulation member 285 may connect the connecting springs 1-1 to 1-9, 2-1 to 2-9, 3-1 to 3-9, and 4-1 to 4-9 of the groups 1A to 4A to each other.

The insulation member 285 may support the connecting springs 1-1 to 1-9, 2-1 to 2-9, 3-1 to 3-9, and 4-1 to 4-9 of the connective elastic member 280, and may be coupled or attached to the second surface 70B of the holder 270.

The connective elastic member 280 may further include one or more dummy members 28-1 to 28-4.

For example, the dummy members 28-1 to 28-4 may be spaced apart from the connecting springs 1-1 to 1-9, 2-1 to 2-9, 3-1 to 3-9, and 4-1 to 4-9, and may be disposed on the lower surface 70B of the holder 270.

The insulation member 285 may surround or cover at least a portion of the dummy members 28-1 to 28-4. As a result, it is possible to securely maintain the shape of the insulation member 285 so as to improve the adhesive force between the insulation member 285 and the holder 270.

The dummy members 28-1 to 28-4 may be alternatively referred to as a "reinforcing portion" or a "reinforcing pattern" because they reinforce the rigidity of the connective elastic member 280.

The dummy members 28-1 to 28-4 may not be conductively connected to the connecting springs 1-1 to 1-9, 2-1 to 2-9, 3-1 to 3-9, and 4-1 to 4-9. Although the dummy members 28-1 to 28-4 are not conductively connected to each other, the disclosure is not limited thereto. In another embodiment, the dummy members may be connected to each other.

For example, the insulation member 285 may have therein a bore or a cavity. The bore or the cavity in the insulation member 285 may correspond to, overlap, or be aligned with at least one of the bore 800A in the first circuit board 800, the bore 501 in the second circuit board 250, and the bore 71 in the holder 270 in the optical-axis direction.

For example, although the connective elastic member 280 may include four dummy members 28-1 to 28-4, the number of dummy members is not limited thereto. In another embodiment, the number of dummy members may be any number greater than or equal to one.

For example, each of the dummy members 28-1 to 28-4 may be disposed between two adjacent groups 1A and 2A, 2A and 3A, 3A and 4A, or 4A and 1A of the connective elastic member 280.

For example, the connective elastic member 280 may include a dummy member 28-3 disposed at the first corner or the first corner region of the insulation member 285 between the first group 1A and the second group 2A, a dummy member 28-2 disposed at the second corner or the second corner region of the insulation member 285 between the second group 2A and the third group 3A, a dummy member 28-1 disposed at the third corner or the third corner region of the insulation member 285 between the third group 3A and the fourth group 4A, and a dummy member 28-4 disposed at the fourth corner or the fourth corner region of the insulation member 285 between the fourth group 4A and the first group 1A.

Each of the dummy members 28-1 to 28-4 may have an escape portion configured to avoid spatial interference with the projection 275 of the holder 270.

The insulation member 285 may include a body 85A, which is disposed on the first portions 31a of the first coupler 31 of the connecting springs 1-1 to 1-9, 2-1 to 2-9, 3-1 to 3-9, and 4-1 to 4-9, a portion of the second surface 70B of the holder 270, and portions of the dummy members 28-1 to 28-4, and an extension 85B extending toward other portions of the dummy members 28-1 to 28-4.

For example, the body 85A of the insulation member 285 may be disposed on the first surface 36A of the second surface 70B of the holder 270 adjacent to the bore 71 in the holder 270, and may be configured to have the form a ring having a closed curve shape. For example, although the body 85A may be configured to have the form of a quadrangular ring, the disclosure is not limited thereto. In another embodiment, the body 85A may be configured to have the form of a circular or polygonal ring.

For example, the body 85A may have therein a bore or a cavity, which corresponds to, overlaps, or is aligned with the bore 800A in the first circuit board 800, the bore 501 in the second circuit board 250, and the bore 71 in the holder 270 in the optical-axis direction.

Although the extension 85B may be configured to have a linear shape, the disclosure is not limited thereto. In another embodiment, the extension 85B may be configured to have at least one of a linear shape and a curved shape. For example, the extension 85B may include a plurality of extensions, which may be disposed so as to be spaced apart from each other.

The extension 85B may serve to increase the contact area with each of the dummy members 28-1 to 28-4 to thus further increase the rigidity of the connective elastic member 280.

The support member 220 may conductively connect the first circuit board 800 to the connective elastic member 280.

The support member 220 may include a plurality of groups of support members, which correspond to the groups 1A to 4A of the connective elastic member 280. Each of the plurality of groups may include a plurality of support members (or wires).

For example, the support member 220 may include a plurality of support members corresponding to the plurality of connecting springs. The support member may be alternatively referred to as a "wire".

The support member 220 may be coupled at one end thereof to the first circuit board 800 and at the other end thereof to the second coupler 32 of the connecting spring 281.

For example, the one end of the support member 220 may be coupled to the first surface (for example, the upper surface) 44A of the first circuit board 800 through the bore 800A in the first circuit board 800 via a first solder 901, and the other end of the support member 220 may be coupled to the lower portion or the lower surface of the second coupler 32 of the connecting spring 281 through the hole 32A in the second coupler 32 via second solder 902.

The support member 220 may extend through the escape region in the housing 450, the holes 250A in the second circuit board 250, and the hole 270a in the holder 270, thereby avoiding spatial interference with the housing 450, the second circuit board 250, and the holder 270.

Each of the support members 220 may be embodied as a member that is conductive and offers elastic support, for example, a suspension wire, a leaf spring, or a coil spring.

The image sensor unit 350 may further include the filter 610. The image sensor unit 350 may further include the filter holder 600 in which the filter 610 is disposed, seated or received. The filter holder 600 may alternatively be referred to as a "sensor base".

The filter 610 may serve to inhibit light within a specific frequency band that passes through the lens barrel 400 from being introduced into the image sensor 810.

The filter 610 may be, for example, an infrared-light-blocking filter, without being limited thereto. For example, the filter 610 may be oriented parallel to the X-Y plane perpendicular to the optical axis OA.

The filter 610 may be disposed under the lens module 400.

The filter holder 600 may be disposed under the AF operation unit 100. For example, the filter holder 600 may be disposed on the connecting board 260.

The filter holder 600 may be coupled to a region of the connecting board surrounding the image sensor 810, and may be exposed through the bore 800A in the first circuit board 800 and the bore 501 in the second circuit board 250. For example, the filter holder 600 may be exposed through the bore 800A in the first circuit board 800 and the bore 501 in the second circuit board 250.

For example, the filter holder 600 may be coupled to a region of the first surface (for example, the upper surface) surrounding the seating region 260A of the connecting board 260. Although the seating region 260A is the same surface as the first surface of the connecting board 260 in FIG. 12, the disclosure is not limited thereto. In another embodiment, the seating region 260A may be a groove or a projection.

In another embodiment, the filter holder 600 may be coupled to the holder 270 or the AF operation unit 100.

The bore 501 in the second circuit board 250 may expose the filter holder 600 disposed at the first circuit board 250 and the filter 610 disposed at the connecting board 260 therethrough.

The filter holder 600 may have therein a bore 60A, which is formed in a region thereof in which the filter 610 is mounted or disposed, so as to allow the light that has passed through the filter 610 to enter the image sensor 810. The bore 60A in the filter holder 600 may be configured to have the form of a through hole, which is formed through the filter holder 600 in the optical-axis direction. For example, the bore 60A in the filter holder 600 may be formed through the center of the filter holder 600, and may be positioned so as to correspond to or face the image sensor 810.

The filter holder 600 may have a seating portion 500, in which the filter 610 is seated. The filter 610 may be disposed, seated or mounted in the seating portion 500. The seating portion 500 may be formed so as to surround the bore 60A. In another embodiment, the seating portion 500 of the filter holder 600 may be configured to have the form of a projection, which projects from the upper surface of the filter 610.

The image sensor unit 350 may further include an adhesive member 612 disposed between the filter 610 and the seating portion 500, and the filter 610 may be coupled or attached to the filter holder 600 via the adhesive member 612.

The image sensor unit 350 may further include an adhesive member 61 disposed between the filter holder 600 and the connecting board 260, and the filter holder 600 may be coupled or attached to the connecting board 260 via the adhesive member 61.

For example, the adhesive member 612 and 61 may be epoxy, thermohardening adhesive, or ultraviolet-hardening adhesive.

The camera module 10 may further include the cover member 300 and the base 210 in order to accommodate therein the AF operation unit 100 and the image sensor unit 350, to protect the AF operation unit 100 and the image sensor unit 350 from external impacts and to inhibit the introduction of external foreign substances.

The cover member 300 may be configured to have the form of a box, which is open at the bottom and which includes the upper plate 301 and the side plates 302. The lower portion of the side plates 302 of the cover member 300 may be coupled to the base 210. The upper plate 301 of the cover member 300 may be configured to have a polygonal shape, for example, a quadrangular shape, an octagonal shape or the like.

The cover member 300 may have therein a bore, which is formed through the upper plate 301 so as to expose the lens (not shown), which is coupled to the bobbin 110, to external light.

The base 210 may be disposed under the holder 270. The base 210 may be configured to have a shape, for example, a quadrangular shape, which coincides with or corresponds to the shape of the cover member 300.

For example, the bore C3 in the base 210 may be a through hole, which is formed through the base 210 in the optical-axis direction.

The base 210 may include a step 211 (see FIG. 18) to which an adhesive is applied when the cover member 300 is adhesively fixed to the base 210. Here, the step 211 may guide the side plate 302 of the cover member 300, which is coupled to the upper side of the base 210. The lower end of the side plate 302 of the cover member 300 may be bonded or fixed to the step 211 of the base 210 by means of an adhesive or the like.

Although the lower portion or the lower side of the base 210 may be closed or blocked by the bottom cover 219, the present disclosure is not limited thereto. In another embodiment, the bottom cover 219 may be omitted.

A stationary part and a movable part of the image sensor unit 350 according to an embodiment will be described with regard to OIS operation.

The image sensor unit 350 may include the stationary part, the movable part (or a moving part), and a connecting part 220 and 280 connecting the stationary part to the movable part. The movable part may be alternatively referred to as an "OIS movable part (or OIS moving part)". The OIS movable part may be movable with respect to the stationary part in a direction perpendicular to the optical axis OA.

The length of the support member 220 may be greater than the sum of the thickness of the stationary part 700 and the thickness of the movable part. Accordingly, the movable part, which is disposed under the OIS stationary part, may be spaced apart from the stationary part by a predetermined distance by means of the elastic support member 220 and 280. Specifically, the movable part may be moved relative to the stationary part in the state of being suspended from the movable part (in the flown state) via the support member 220 by the electromagnetic force resulting from the interaction between the magnet 23 and the coil 230.

The OIS movable part may be moved relative to the stationary part in a direction perpendicular to the optical axis by the electromagnetic force resulting from the interaction between the second coil 230 and the magnet 23.

For example, by the interaction between the magnet 23 and the second coil 230, the image sensor 810 may be shifted or tilted in a direction perpendicular to the optical axis OA, or may be rotated about the optical axis OA. For example, the optical-axis direction may be a direction perpendicular to one surface of the image sensor 810. For example, the one surface of the image sensor 810 may be the upper surface of the image sensor 810. Alternatively, the one surface of the image sensor 810 may be a surface that corresponds to or faces the lower surface of the lens module 400 or the filter 610.

By virtue of the support member 220 and the connective elastic member 280, the OIS movable part may be elastically supported, and may be moved in a direction perpendicular to the optical axis.

The stationary part may include the first circuit board 800, the housing 450, and the magnet 23. Furthermore, the stationary part may include the base 210 and the cover member 300.

The OIS movable part may include the second circuit board 250, the second coil 230, the connecting board 260, and the image sensor 810. The OIS movable part may further include the holder 270.

Furthermore, the OIS movable part may include elements that are coupled to the second circuit board 250, for example, the second position sensor 240, the motion sensor 820, the controller 830, the memory 512, and the capacitor 514. Furthermore, the OIS movable part may include the filter holder 600 and the filter 610.

For example, the OIS movable part may include the connecting board 260, which is coupled to the connective elastic member 280, the image sensor 810 and the second circuit board 250, which are coupled to the connecting board 260, and the holder 270, which is coupled to the second circuit board 250, and may be elastically supported by the support member 220 and the connective elastic member 280.

The magnet 23 may be disposed at the stationary part, and the second coil 230 may be disposed at the OIS movable part. By virtue of the interaction between the magnet 23 and the second coil 230, the OIS movable part may be moved or tilted relative to the stationary part.

For example, the stationary part may include the magnet 130 and the first circuit board unit 800.

For example, the movable part may include the holder 270, the second circuit board unit, which is spaced apart from the first circuit board unit 800 and is coupled to the holder 270, and the second coil 230, which is disposed at the second circuit board unit so as to face the magnet 130.

For example, one end of the support member 220 may be coupled to the first circuit board unit 800.

For example, the connective elastic member 280 may be disposed at the holder 270, and may include the first coupler 31 coupled to the second circuit board unit, the second coupler 32 coupled to the other end of the support member 220, and the connector 33 connecting the first coupler 31 to the second coupler 32.

Referring to FIGS. 20 and 21, in order to move and tilt the OIS movable part relative to the stationary part using the electromagnetic force resulting from the interaction between the magnet 23 and the second coil 230, the OIS movable part may be spaced apart from the housing 450 and the base 210.

For example, at the initial position of the OIS movable part, the outer surface of the holder 270 may be spaced apart from the inner surface of the base 210 by a predetermined distance d1.

Furthermore, for example, at the initial position of the OIS movable part, the lower surface of the holder 270 and the lower surface of the connecting board 260 may be spaced apart from the bottom of the base 210 by a predetermined distance H1. Furthermore, at the initial position of the OIS movable part, the lower surface of the holder 270 and the lower surface of the connecting board 260 may be spaced apart from the front surface (or the inner surface) of the bottom cover 219.

Furthermore, for example, at the initial position of the OIS movable part, the solder 902 may be spaced apart from the front surface (or the inner surface) of the bottom cover 219. Furthermore, for example, at the initial position of the OIS movable part, the solder 902 may be spaced apart from the bottom of the base 210.

The initial position of the OIS movable part may be the original position of the OIS movable part in the state in which no electric power is applied to the second coil 23 or the position at which the OIS movable part is located as the result of the support member 220 and the connective elastic member 280 being elastically deformed due only to the weight of the OIS movable part.

In addition, the initial position of the OIS movable part may be the position at which the OIS movable part is located when gravity acts in the direction from the first circuit board 800 to the second circuit board 250 or when gravity acts in the direction from the second circuit board 250 to the first circuit board 800.

Figure 23:
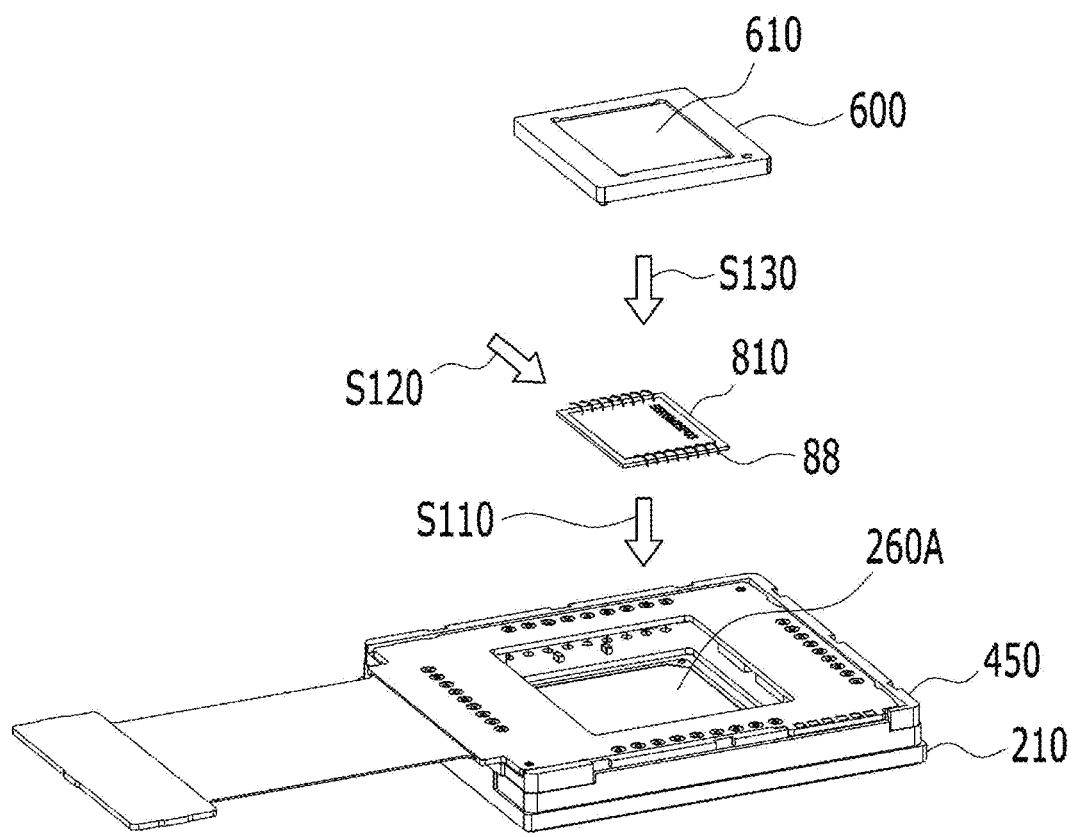
FIG. 23 is a view illustrating a process of mounting the image sensor, the filter holder, and the filter on the connecting board.

FIG. 23 illustrates a process of mounting the image sensor 810, the filter holder 600, and the filter 610 to the connecting board 260.

Referring to FIG. 23, the image sensor 810 may be first coupled, fixed, or attached to the seating region 260A of the connecting board 260 through die bonding (S110).

The image sensor 810 may be any one of a charge-coupled device (CCD), a metal oxide semiconductor (MOS), a CPD image sensor and a CID image sensor, without being limited thereto.

Subsequently, the image sensor 810 may be bonded to the connecting board 260 via a wire 88 such that the image sensor 810 is conductively connected to the connecting board 260 (S120).

Subsequently, the filter holder 600 with the filter 601 mounted thereon may be mounted on the connecting board 260 via the adhesive member 61 (S130). For example, the filter 610 may be coupled to the filter holder 600 via the adhesive member 612, and then the filter holder 600 may be coupled to the connecting board 260. In another embodiment, the filter holder 600 may be coupled to the connecting board 260, and then the filter 610 may be coupled to the filter holder 600.

In a comparative example, the image sensor may be mounted on an additional sensor board, and then the sensor board may be connected to the connecting board.

In the comparative example, the sensor board may be connected to the connecting board through soldering. The soldering is an additional process, and makes it difficult to connect the sensor board to the fourth circuit board. Furthermore, in the comparative example, noise may be generated at the image sensor and the image sensor may be influenced by the noise during the process of soldering the sensor board to the connecting board. In addition, in the comparative example, due to tolerance stacking in the process of soldering the sensor board, there may be difficulties in alignment between the lens module and the image sensor and between the lens module and the cover member.

In the embodiment, the sensor board in the comparative example is fused to the connecting board so as to realize a single integrated fourth circuit board 260. In the example, the image sensor 810 is moved to the fourth circuit board from above the image sensor unit 350 and is then bonded to the connecting board 260 through die bonding, and the image sensor is conductively connected to the connecting board through wire bonding. Subsequently, the filter holder 600 and the filter 610 are moved to the connecting board 260 from above the image sensor unit 350, and are coupled to the connecting board 260.

In comparison with the comparative example, the embodiment is able to simplify a process of assembling a camera. Furthermore, it is possible to reduce the number of soldering points in the signal path of the image sensor, and it is possible to inhibit the image sensor from becoming inoperable or to suppress image noise.

In addition, in comparison with the comparative example, the embodiment is able to simplify an assembly process and thus to eliminate tolerance stacking. Therefore, it is also advantageous in managing alignment of the lens module 400.

Furthermore, in comparison with the comparative example, the embodiment is able to offer effect of reducing material cost and manufacturing costs by reducing the number of components and the number of processes.

Figure 24:
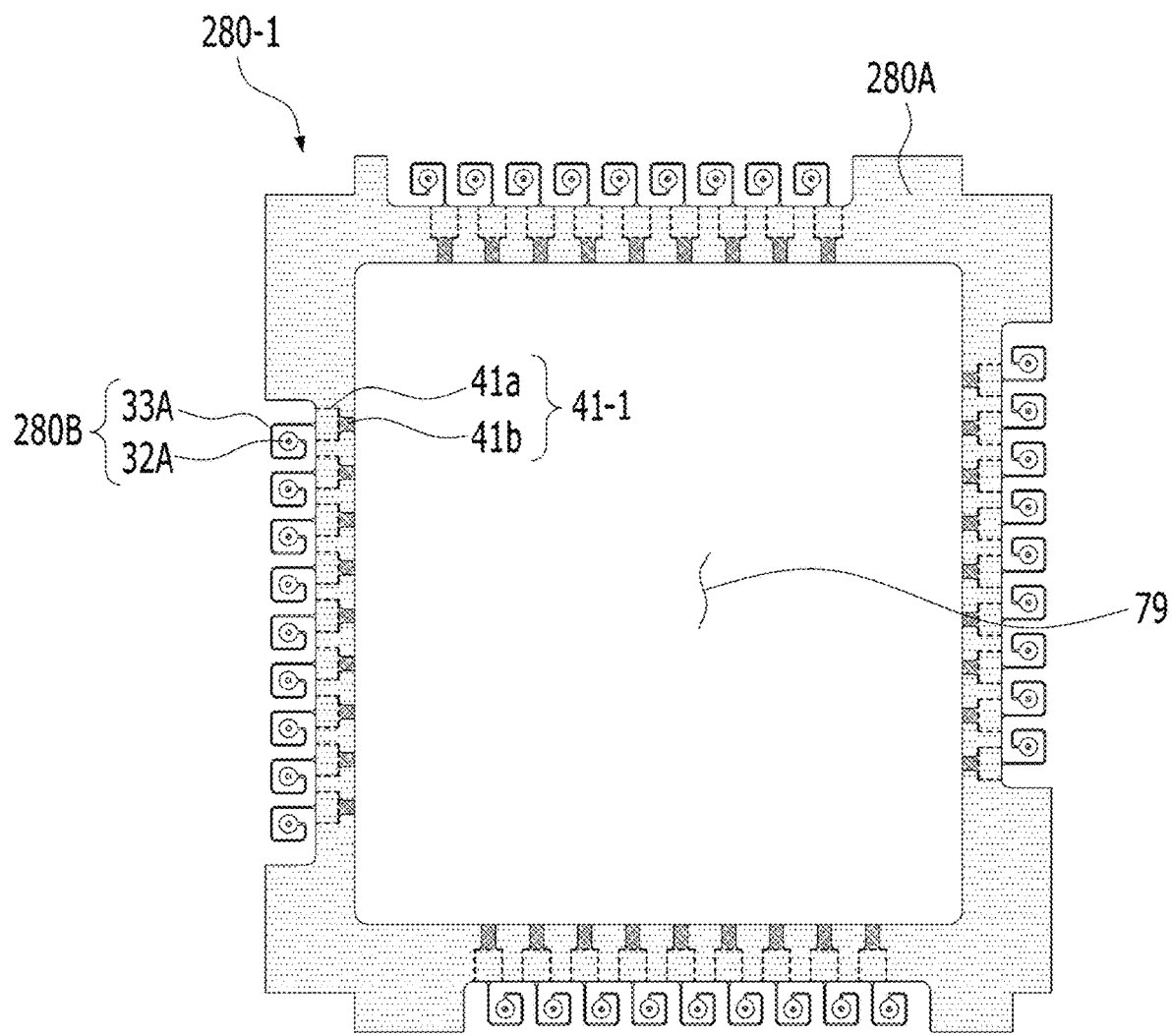
FIG. 24 is a view illustrating a connective elastic member according to another embodiment.

FIG. 24 illustrates a connective elastic member 280-1 according to another embodiment.

Referring to FIG. 24, the connective elastic member 280-1 may include a board portion 280A and an elastic portion 280B. The board portion 280A may be alternatively referred to as a "board member", a "circuit board", a "board" or a "circuit member".

The board portion 280A may include a plurality of terminals 41-1 corresponding to the terminals 262 of the connecting board 260.

The board portion 280-1 may have therein a bore 79 corresponding to the bore 71 in the holder 270. The bore 79 in the board portion 280-1 may be a through hole, which is formed through the board portion 280-1 in the optical-axis direction.

For example, the bore 79 in the board portion 280-1 may have a surface area larger than that of the second surface 60B of the connecting board 260. For example, the bore 79 in the board portion 280-1 may expose the second surface 60B of the connecting board 260, and may expose the terminals 262 of the connecting board 260.

The terminal 41-1 of the board portion 280A may include a first portion 41a and a second portion 41b. The first portion 41a of the terminal 41-1 may be disposed in the board portion 280A, and the second portion 41b of the terminal 41-1 may be exposed to the outside from the board portion 280A, and may be coupled to the terminal 262 of the connecting board 260 via solder.

The board portion 280A may be disposed on the second surface 70B of the holder 270, and may be coupled or attached to the second surface 70B of the holder 270 via an adhesive member.

For example, the board portion 280A may be embodied as a printed circuit board or an FPCB.

The elastic portion 280B may be exposed from the board portion 280A, and may be connected to the terminal 41-1 of the board portion 280A.

The elastic portion 280B may include a coupler 32A coupled to the support member 220 and a connector 33A connecting the coupling portion 32A to the terminal 41-1.

The elastic portion 280B and the terminal 41-1 of the board portion 280A may correspond to the connecting spring 281 shown in FIG. 16.

For example, the first portion 41a of the terminal 41-1 may correspond to the first portion 31a of the connecting spring 281 shown in FIG. 16, and the second portion 41b of the terminal 41-1 may correspond to the second portion of the connecting spring 281 shown in FIG. 16. The description of the first and second portions 31a and 31b of the connecting spring 281 may be applied to the first and second portions 41a and 41b of the terminal 41-1, with or without modification.

Furthermore, the coupler 32A of the elastic portion 280B may correspond to the second coupler 32 of the connecting spring 281 shown in FIG. 16, and the connector 33A of the elastic portion 280B may correspond to the connector 33 of the connecting spring 281 shown in FIG. 16. The description of the second coupler 32 and the connector 33 of the connecting spring 281 may be applied to the coupler 32A and the connector 33A of the elastic portion 280B with or without modification.

The description of the groups 1A to 4A of the connective elastic member 280 shown in FIG. 17 may be applied to the connective elastic member 280-1 shown in FIG. 24 with or without modification.

The board portion 280A may include the dummy members 28-1 to 28-4 shown in FIGS. 14 and 17, and the description of the dummy members 28-1 to 28-4 may be applied to the dummy members of the board portion 280A with or without modification.

Figure 25:
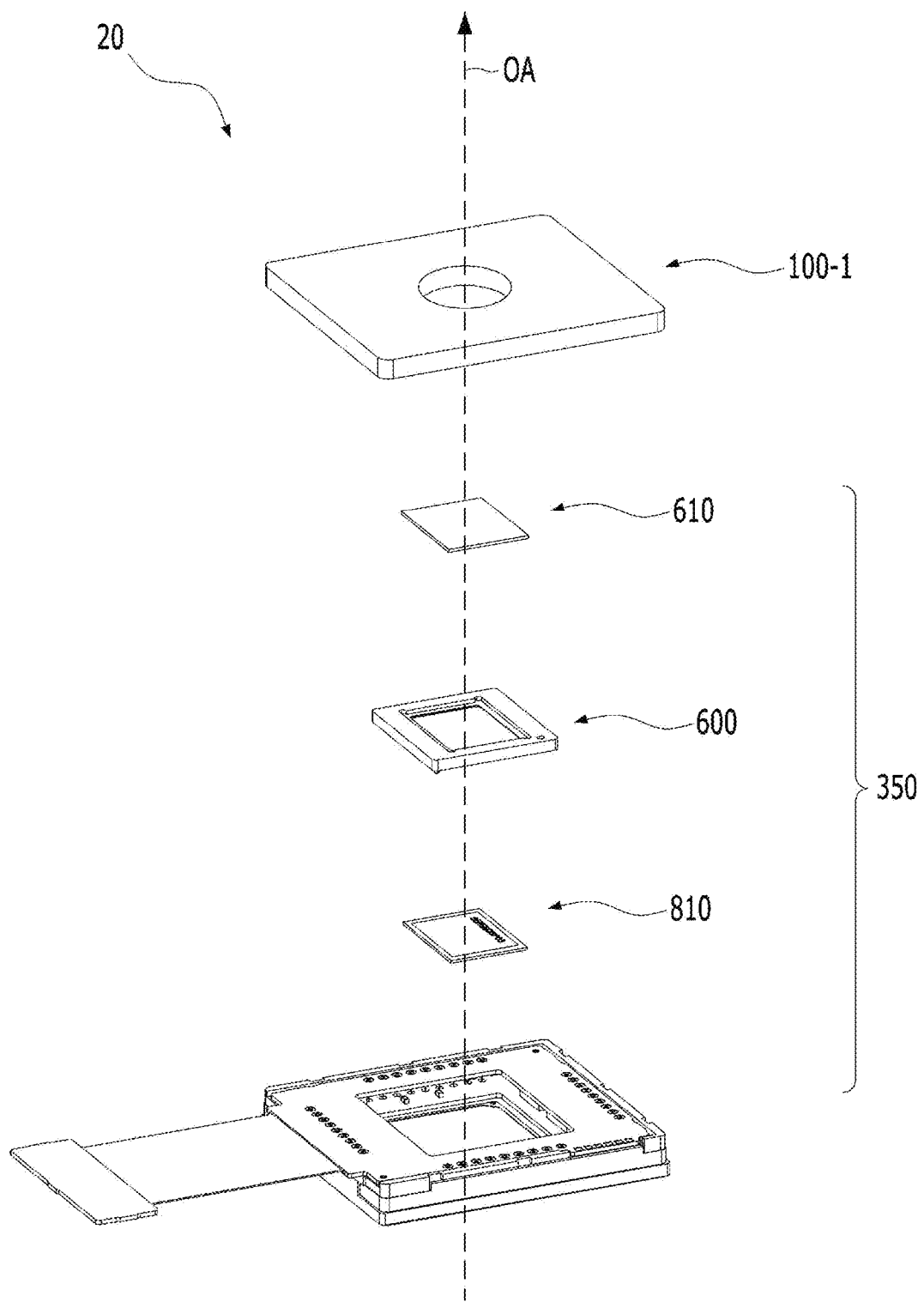
FIG. 25 is an exploded perspective view of a camera module according to another embodiment.
Figure 26:
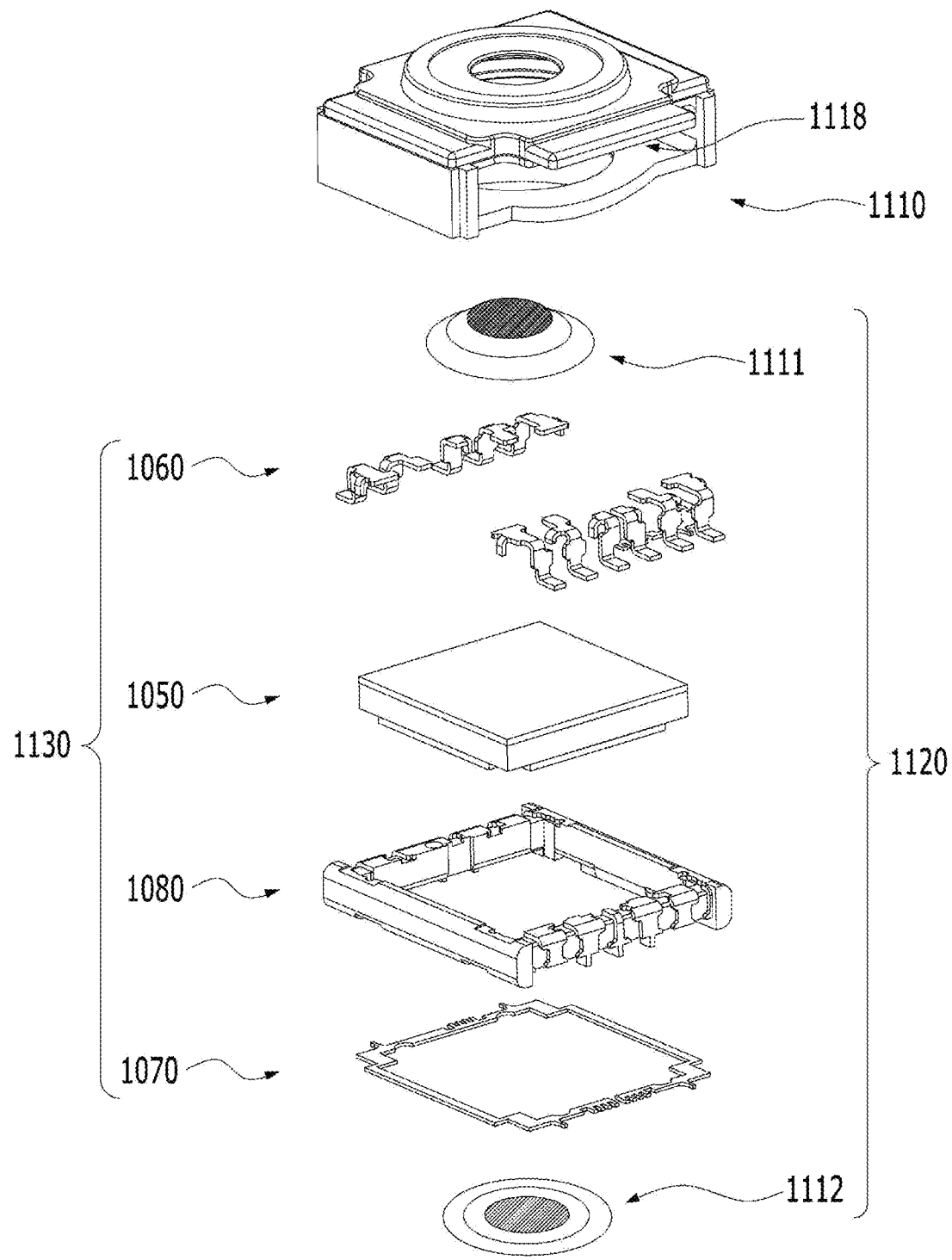
FIG. 26 is a view illustrating an embodiment of the AF operation unit shown in FIG. 25.

FIG. 25 is an exploded perspective view of a camera module 20 according to another embodiment of the present invention. FIG. 26 is a view illustrating an embodiment 100-1 of the AF operation unit shown FIG. 25. Reference numerals in FIG. 25, which are the same as those in FIG. 2, denote the same components, and description of the same components is given briefly or omitted.

Referring to FIGS. 25 and 26, the camera module 20 may include the AF operation unit 100-1 and the image sensor unit 350. In the camera module 200 shown in FIG. 25, the lens module 400 and the AF operation unit 100 shown in FIG. 2 may be replaced with the AF operation unit 100-1.

The AF operation unit 100-1 may include a barrel unit 1110 and a lens assembly 1120. The barrel unit 1110 may be alternatively referred to as a "lens barrel" or a "holder".

The lens assembly 1120 may be mounted to or disposed at the barrel unit 1110.

For example, the lens assembly 1120 may include a liquid lens unit 1130 including a liquid lens 1050. For example, the lens assembly 1120 may include at least one of the liquid lens unit 1130, a first lens unit 1111, and a second lens unit 1112.

In the lens assembly 1120, the first lens unit 1111 may be alternatively referred to as a "first solid lens unit", and the second lens unit 1112 may be alternatively referred to as a "second solid lens unit".

The liquid lens unit 1130 may include the liquid lens 1050, a first terminal 1060, a second terminal 1070, and a holder 1080. In another embodiment, the liquid lens unit 1130 may not include at least one of the first terminal 1060, the second terminal 1070, and the holder 1080. For example, the liquid lens unit 1130 may include the liquid lens 1050, the first terminal 1060, and the second terminal 1070.

The first terminal 1060 may be alternatively referred to as an "upper terminal", and the second terminal 1070 may be alternatively referred to as a "lower terminal".

The liquid lens 1050 may be disposed between the lens of the first lens unit 1111 and the lens of the second lens unit 1112, and may be spaced apart both from the lens of the first lens unit 1111 and from the lens of the second lens unit 1112 in the optical-axis direction.

The liquid lens 1050 may include a liquid lens region including different kinds of liquid, a first electrode region conductively connected to the first terminal 1060, and a second electrode region conductively connected to the second terminal 1070.

The liquid lens region may include a first liquid that is conductive and a second liquid that is not conductive, and an interface may be formed between the first liquid and the second liquid.

In the liquid lens 50, the interface formed between the conductive liquid and the non-conductive liquid may be deformed in response to a drive signal (for example, drive current or drive voltage) or a control signal, and the focal length of the liquid lens may be controlled by the deformed interface. Consequently, AF operation for the lens assembly 1120 may be performed, and the focus of the camera module may be controlled.

The holder 1080 may receive or support the liquid lens 1050. For example, the holder 1080 may receive or support the liquid lens 1050, the first terminal 1060, and the second terminal 1070.

The holder 1080 may have a hole or a bore configured to receive the liquid lens 1050 therein. For example, the hole or the bore in the holder 1080, configured to receive the liquid lens therein, may be formed through the holder 80 in the optical-axis direction.

The liquid lens 1050 may be disposed or seated on the holder 1080. For example, the liquid lens 1050 may be disposed or seated in the hole in the holder 1080. The liquid lens 1050, the first terminal 1060, and the second terminal 1070 may be disposed or seated on the holder 1080.

The barrel unit 1110 may be disposed on the first circuit board 800.

Alternatively, the barrel unit 1110 may be disposed on the housing 450.

For example, although the shape of the outer circumferential surface of the barrel unit 1110 may coincide with or be identical to the shape of the housing 450 when viewed from above, the present disclosure is not limited thereto.

For example, the barrel unit 1110 may be coupled to the housing 450.

For example, the lower portion, the lower end, or the lower surface of the barrel unit 1110 may be coupled to the upper portion, the upper end, or the upper surface of the housing 450 by means of an adhesive member or a coupling structure. Here, the coupling structure may include a first coupler provided at the upper portion, the upper end, or the upper surface of the barrel unit 1110, and a second coupler provided at the upper portion, the upper end, or the upper surface of the housing 450. The first coupler may be a protrusion or a groove (or hole), and the second coupler may be a groove (or hole) or a protrusion.

The barrel unit 1110 may have a hole or an opening 1118 into which the liquid lens unit 1130 is mounted or inserted. The hole or the opening 1118 in the barrel unit 1110 may be formed through the barrel unit 1110 in a direction perpendicular to the optical axis, and the liquid lens unit 1130 may be inserted into the hole or the opening 1118 in the barrel unit 1110 in a direction perpendicular to the optical axis, and may be mounted or coupled to the barrel unit 1110.

The lens assembly 1120 may correspond to or face the filter 610 and the image sensor 810 in the direction of the optical axis OA. For example, the liquid lens 1050 may correspond to or face the filter 610 and the image sensor 810 in the direction of the optical axis OA.

With the development of camera technology, resolution of an image becomes high, and thus the size of an image sensor is being increased. Because the size of an image sensor is being increased, the size of a lens module and the size of an actuator for shifting the lens module are also being increased. Consequently, not only the weight of a lens module but also the weight of other actuator components for moving the lens module increase.

According to an embodiment of the present invention, autofocusing is performed using the AF operation unit (or the first actuator) 100, which is operated in a lens shift manner, and optical image stabilization (OIS) is performed using the image sensor unit (or the second actuator) 350, which is operated in an image sensor shift manner, thereby improving the reliability of the camera device.

The embodiment is able to perform 5-axis handshake correction using the sensor shift manner. For example, the 5-axis handshake may include two angular handshakes (for example, pitch and yaw), two shift handshakes (for example, x-axis shift and y-axis shift), and one rotational handshake (for example, roll).

The camera module 10 or 20 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 27:
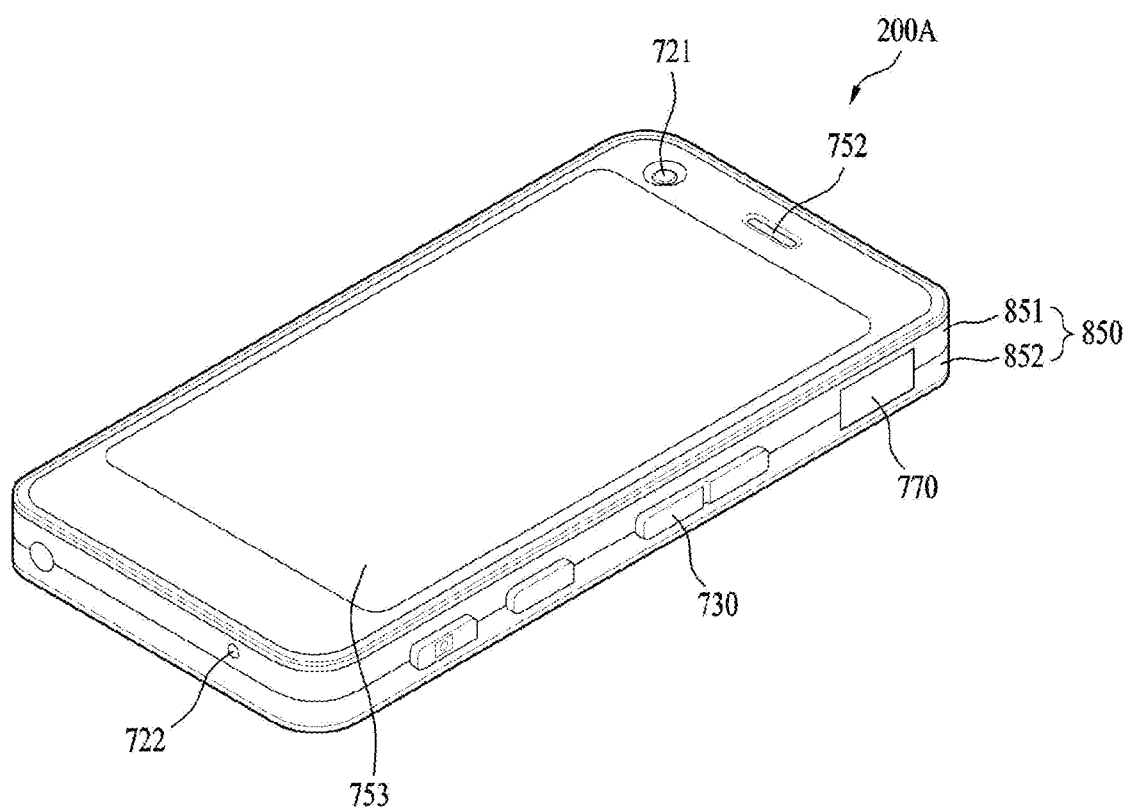
FIG. 27 is a perspective view illustrating a portable terminal according to an embodiment.
Figure 28:
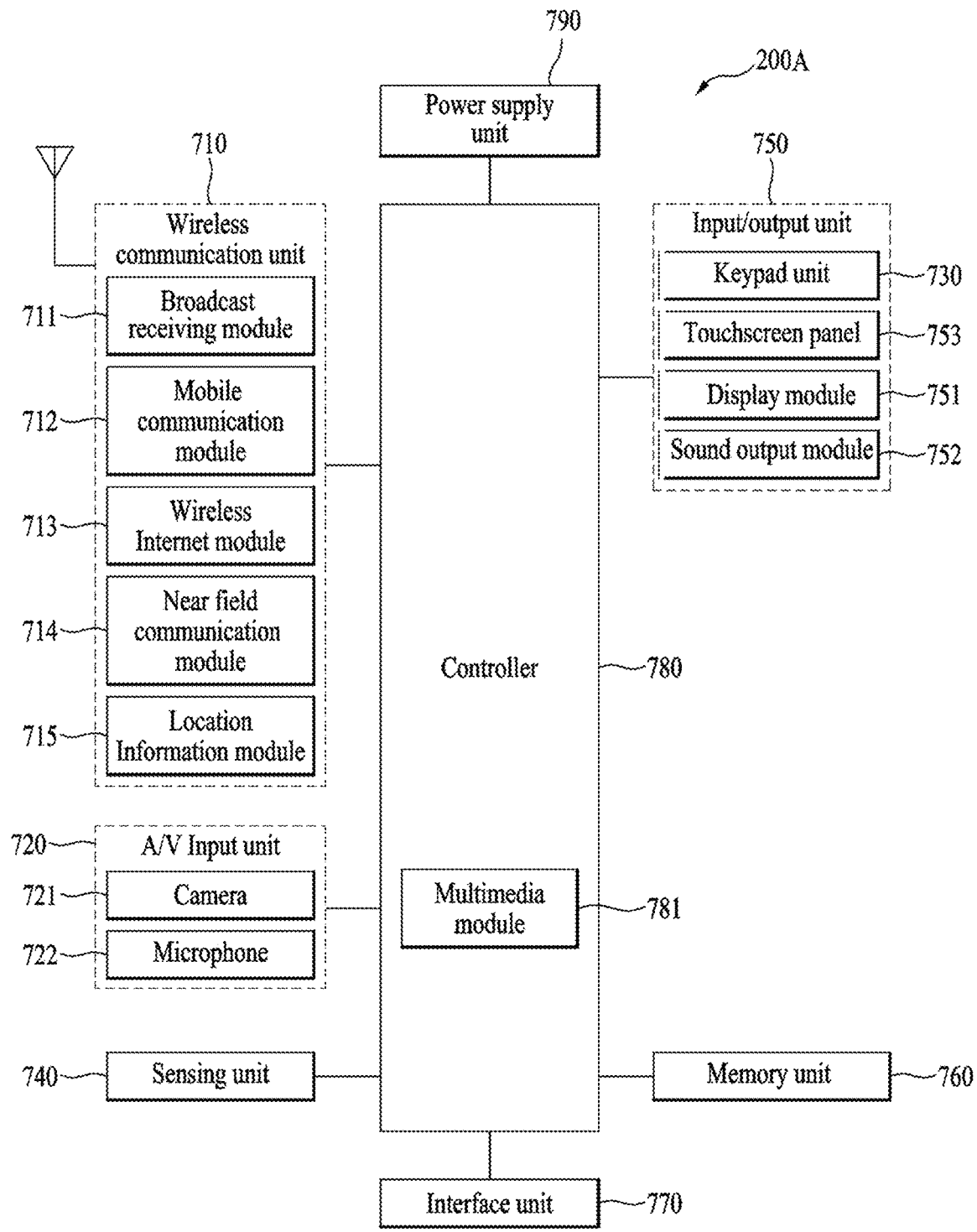
FIG. 28 is a view illustrating the configuration of the portable terminal illustrated in FIG. 27.

FIG. 27 is a perspective view illustrating a portable terminal 200A according to an embodiment. FIG. 28 is a view illustrating the configuration of the portable terminal shown in FIG. 27.

Referring to FIGS. 27 and 28, the portable terminal (hereinafter, referred to as a "terminal") 200A may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 27 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (a casing, housing, cover or the like) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 10 or 20 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 180, or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus, a camera module, and an optical device, which are capable of simplifying a process of assembling a camera, reducing the number of soldering points in the signal path of the image sensor, and inhibiting the image sensor from becoming inoperable and suppressing image noise.

The invention claimed is:

1. A camera module comprising:
a stationary part comprising a housing, a first circuit board part coupled to the housing, and a magnet disposed on the housing;
a movable part disposed under the stationary part so as to be spaced apart from the stationary part; and
a connecting part comprising an upper end connected to the stationary part and a lower end connected to the movable part and configured to support the movable part,
wherein the movable part comprises:
a holder spaced apart from the housing;
a second circuit board part coupled to the holder and disposed under the first circuit board part;
a coil disposed on the second circuit board part so as to be positioned under the magnet;
an image sensor disposed on the second circuit board part,
wherein the movable part connected to the lower end of the connecting part is configured to be movable or tilted in a direction perpendicular to an optical axis by an interaction between the magnet and the coil.

2. The camera module according to claim 1, wherein the connecting part comprises a support member configured to support the movable part, and
wherein a length of the support member is greater than a sum of a thickness of the stationary part and a thickness of the movable part.

3. The camera module according to claim 1, wherein the connecting part comprises a wire.

4. The camera module according to claim 1, wherein the connecting part comprises a plurality of wires spaced apart from each other.

5. The camera module according to claim 3, wherein the lower end of the connecting part is coupled to the second circuit board part.

6. The camera module according to claim 1, wherein the coil is positioned higher than the holder.

7. The camera module according to claim 1, wherein the second circuit board part has a hole through which the image sensor is exposed.

8. The camera module according to claim 1, wherein the movable part is configured to be shifted or tilted in a direction perpendicular to the optical axis by virtue of an interaction between the magnet and the coil, and the optical axis is perpendicular to one surface of the image sensor.

9. The camera module according to claim 1, comprising a lens module spaced apart from the image sensor.

10. The camera module according to claim 9, comprising a filter disposed on the image sensor.

11. The camera module according to claim 10, wherein the movable part comprises a filter holder disposed around the image sensor, and the filter is disposed on the filter holder.

12. The camera module according to claim 11, wherein the coil comprises a plurality of coil units, and the magnet comprises a plurality of magnets corresponding to the plurality of coil units.

13. The camera module according to claim 1, wherein the first circuit board part is positioned higher than the second circuit board part and the image sensor.

14. The camera module according to claim 1, wherein the coil is disposed to face the magnet in a direction parallel to the optical axis.

15. The camera module according to claim 1, wherein the movable part comprises a position sensor disposed on the second circuit board part and configured to detect a displacement of the movable part in the direction perpendicular to the optical axis.

16. An optical device comprising the camera module according to claim 1.

17. A camera module comprising:
a stationary part comprising a first circuit board part;
a movable part disposed under the stationary part and comprising a second circuit board part and an image sensor disposed on the second circuit board part;
a connecting part connecting the stationary part and the movable part,
wherein the movable part is configured to be movable or tilted with respect to the stationary part in a direction perpendicular to an optical axis,
wherein the connecting part comprises a support member comprising an upper end connected to the stationary part and a lower end connected to the movable part,
wherein the first circuit board part comprises a first region connected to the upper end of the support member, second region comprising a connector, and a third region connecting the first region and the second region, and
wherein the support member is a wire.

18. The camera module according to claim 17, wherein a length of the support member in a direction parallel to the optical axis is greater than a sum of a length of the stationary part in the direction parallel to the optical axis and a length of the movable part in the direction parallel to the optical axis.

19. The camera module according to claim 17, wherein the first circuit board is positioned higher than the image sensor.

* * * * *